United States Patent
Luo et al.

(10) Patent No.: US 7,251,406 B2
(45) Date of Patent: Jul. 31, 2007

(54) OPTICAL WAVEGUIDE TERMINATION WITH VERTICAL AND HORIZONTAL MODE SHAPING

(75) Inventors: Hui Luo, Markham (CA); Mindaugas F. Dautartas, Blacksburg, VA (US); Dan A. Steinberg, Blacksburg, VA (US); David W. Sherrer, Blacksburg, VA (US)

(73) Assignee: Shipley Company, L.L.C., Marlborough, MA (US)

(*) Notice: Subject to any disclaimer, the term of this patent is extended or adjusted under 35 U.S.C. 154(b) by 196 days.

(21) Appl. No.: 10/498,182

(22) PCT Filed: Dec. 5, 2002
(Under 37 CFR 1.47)

(86) PCT No.: PCT/US02/38553
§ 371 (c)(1),
(2), (4) Date: Dec. 3, 2004

(87) PCT Pub. No.: WO03/050580
PCT Pub. Date: Jun. 19, 2003

(65) Prior Publication Data
US 2005/0202554 A1   Sep. 15, 2005

Related U.S. Application Data

(63) Continuation-in-part of application No. PCT/US01/51497, filed on Dec. 14, 2001.

(60) Provisional application No. 60/336,933, filed on Dec. 5, 2001, provisional application No. 60/287,032, filed on Apr. 30, 2001, provisional application No. 60/255,868, filed on Dec. 14, 2000.

(51) Int. Cl.
    *G02B 6/10* (2006.01)

(52) U.S. Cl. .............. 385/131; 385/14; 385/129; 385/130; 385/132; 385/28; 385/43

(58) Field of Classification Search ............ 385/14, 385/27, 28, 43, 31, 129, 130, 131, 132, 11, 385/49, 141
See application file for complete search history.

(56) References Cited

U.S. PATENT DOCUMENTS

| 3,984,173 A | 10/1976 | Shaw |
| 4,066,482 A | 1/1978 | Shaw |
| 4,097,118 A | 6/1978 | Hammer |

(Continued)

FOREIGN PATENT DOCUMENTS

EP    0687925    12/1995

(Continued)

OTHER PUBLICATIONS

Lierstuen et al., "Coupling losses between standard single-mode fibers and rectangular waveguides for integrated optics", Appl. Optics, vol. 34 (1995), No. 6, pp. 1024-1028.

(Continued)

*Primary Examiner*—Brian M. Healy
(74) *Attorney, Agent, or Firm*—Jonathan D. Baskin

(57) ABSTRACT

An optical device is disclosed which includes a single-mode waveguide (700) which supports a first optical mode in a first region and a second optical mode in a second region. The waveguide includes a guiding layer (703) having at least one wing (750) extended outwardly from the guiding layer (703). The guiding layer (703) may desirably have a rib waveguide (706, 707) cross sectional shape at the wings. The wings (750) decrease in width along the length of the guiding layer to convert a rib waveguide mode at the wings to a channel waveguide mode.

19 Claims, 18 Drawing Sheets

U.S. PATENT DOCUMENTS

| | | |
|---|---|---|
| 4,296,143 A | 10/1981 | Franken et al. |
| 4,370,021 A | 1/1983 | Khoe et al. |
| 4,384,038 A | 5/1983 | Khoe et al. |
| 4,415,227 A | 11/1983 | Unger |
| 4,426,440 A | 1/1984 | Thompson |
| 4,524,127 A | 6/1985 | Kane |
| 4,585,299 A | 4/1986 | Strain |
| 4,678,267 A | 7/1987 | Burns et al. |
| 4,688,884 A | 8/1987 | Scifres et al. |
| 4,773,720 A | 9/1988 | Hammer |
| 4,789,642 A | 12/1988 | Lorenzo et al. |
| 4,886,538 A | 12/1989 | Mahapatra |
| 4,927,781 A | 5/1990 | Miller |
| 4,931,077 A | 6/1990 | Angenent et al. |
| 4,991,926 A | 2/1991 | Pavlath |
| 5,009,475 A | 4/1991 | Knudson |
| 5,018,809 A | 5/1991 | Shin et al. |
| 5,057,022 A | 10/1991 | Miller |
| 5,071,216 A | 12/1991 | Sullivan |
| 5,078,516 A | 1/1992 | Kapon et al. |
| 5,135,590 A | 8/1992 | Basavanhally et al. |
| 5,142,596 A | 8/1992 | Mizuuchi et al. ......... 385/43 X |
| 5,172,143 A | 12/1992 | Baude et al. |
| 5,208,882 A | 5/1993 | Strasser et al. |
| 5,265,177 A | 11/1993 | Cho et al. |
| 5,278,926 A | 1/1994 | Doussiere |
| 5,281,305 A | 1/1994 | Lee et al. |
| 5,351,323 A | 9/1994 | Miller et al. |
| 5,354,709 A | 10/1994 | Lorenzo et al. |
| 5,439,782 A | 8/1995 | Haemmerle et al. |
| 5,444,805 A | 8/1995 | Mayer |
| 5,456,797 A | 10/1995 | Weber et al. |
| 5,465,860 A | 11/1995 | Fujimoto et al. |
| 5,540,346 A | 7/1996 | Fujimoto et al. |
| 5,546,209 A | 8/1996 | Willner et al. |
| 5,576,149 A | 11/1996 | Yamamoto et al. |
| 5,629,999 A | 5/1997 | Henry et al. |
| 5,671,316 A | 9/1997 | Yuhara et al. |
| 5,672,538 A | 9/1997 | Liaw et al. |
| 5,703,895 A | 12/1997 | Ghirardi et al. |
| 5,737,474 A | 4/1998 | Aoki et al. |
| 5,796,906 A * | 8/1998 | Narayanan et al. ......... 385/129 |
| 5,844,929 A | 12/1998 | Lealman et al. |
| 5,854,868 A | 12/1998 | Yoshimura et al. |
| 5,868,952 A | 2/1999 | Hatakeyama et al. |
| 5,940,557 A | 8/1999 | Harker |
| 5,953,477 A | 9/1999 | Wach et al. |
| 5,966,617 A | 10/1999 | Ismail |
| 5,999,295 A | 12/1999 | Vowell et al. |
| 6,003,222 A | 12/1999 | Barbarossa |
| 6,015,976 A | 1/2000 | Hatakeyama et al. |
| 6,037,189 A | 3/2000 | Goto |
| 6,108,478 A | 8/2000 | Harpin et al. |
| 6,197,656 B1 | 3/2001 | Adkisson et al. |
| 6,229,947 B1 | 5/2001 | Vawter et al. |
| 6,253,009 B1 | 6/2001 | Lestra et al. |
| 6,292,609 B1 | 9/2001 | Matsushima et al. |
| 6,317,445 B1 | 11/2001 | Coleman et al. |
| 6,330,378 B1 * | 12/2001 | Forrest et al. ................. 385/14 |
| 6,396,984 B1 * | 5/2002 | Cho et al. ..................... 385/43 |
| 6,819,814 B2 * | 11/2004 | Forrest et al. ................. 385/14 |
| 6,987,919 B2 * | 1/2006 | Luo et al. .................... 385/129 |
| 7,079,727 B1 * | 7/2006 | Little .......................... 385/28 |
| 2003/0002793 A1 | 1/2003 | Dautartas |
| 2003/0068149 A1 | 4/2003 | Dautartas et al. |
| 2003/0118310 A1 | 6/2003 | Steinberg et al. |

FOREIGN PATENT DOCUMENTS

| | | | |
|---|---|---|---|
| JP | 02 081005 | 3/1990 | ............. 385/129 X |
| JP | 06-174982 | 6/1994 | ................. 385/129 |
| WO | WO 97/42534 | 11/1997 | |
| WO | WO 01/27670 | 10/2000 | ............. 385/129 X |
| WO | WO 02/095453 | 11/2002 | |
| WO | WO 03/050580 | 6/2003 | |

OTHER PUBLICATIONS

R. M. deRidder, "Silicon Oxynitride planar waveguiding structures for application in optical communication", IEEE J. Sel. Top. Quant., vol. 4 (1998), No. 6.

Janz et al., "Improved fibre coupling to GaAs/AlGaAs rib waveguides using a regrowth-free mode 'drive-down' technique", Electronics Letters, vol. 32, No. 11, May 23, 1996, pp. 1002-1003.

Bauer et al., "High Responsivity Integrated Tapered Waveguide PIN Photodiode", Proceedings of the European Conference on Optical Communication (ECOC) Montreux, Sep. 12-16, 1993, Regular Papers, Zurich, SEV, CH, vol. 2, Sep. 12, 1993, pp. 277-280.

Lealman, I.F., et al., "Tapered Active Layer Device Performance and Its Impact on Low Cost Optoelectronics", 4:00-4:30 pm (Invited) EMGW2.2, pp. 11 and 12, not data.

Shani, Y., et al. "Efficient Coupling of a Semiconductor Laser to an Optical Fiber by Means of a Tapered Waveguide on Silicon", Appl. Phys. Lett., 55: 2389-2391 (1989).

Spuhler, M.M., et al., "Very Short Planar Silica Spot-Size Converter"; Journal of Lightwave Technology, vol. 16, No. 9, pp. 1681-1685 (Sep. 1998).

* cited by examiner

OPTICAL WAVEGUIDE TERMINATION WITH VERTICAL AND HORIZONTAL MODE SHAPING

RELATED APPLICATIONS

This application is a National Stage of International Application No. PCT/US02/38553, filed Dec. 5, 2002, which claims the benefit of priority of U.S. Provisional Application 60/336,933, filed on Dec. 5, 2001. This application is also a continuation-in-part application of International Application No. PCT/US01/51497, filed on Dec. 14, 2001, which claims the benefit of priority of Provisional Application No. 60/255,868, filed Dec. 14, 2000 and Provisional Application No. 60/287,032, filed Apr. 30, 2001. The entire contents of the above-referenced application(s) are incorporated herein by reference.

FIELD OF THE INVENTION

The present invention relates generally to optical integrated circuits (OIC), and particularly to, a structure for coupling optical waveguides.

BACKGROUND OF THE INVENTION

Optical communications are evolving as the chosen technique for data and voice communications. Currently most OICs in the optical network are passive components that are discretely packaged, providing a singular functionality such as power splitting an optical signal into several signals (1×N), creating (N×M) switches for optical signals, equalizing or attenuating signals, wavelength demultiplexing via arrayed waveguide gratings, or adding and dropping selected wavelengths into the optical path (Optical Add-Drop Multiplexing). Higher levels of integration may combine several of these functions on a single OIC chip. In addition the hybrid integration of active dies such as lasers, modulators, and photodetectors has been accomplished and is gaining in popularity as more mature manufacturing methods are developed.

Although the technology is maturing rapidly, optical integrated circuits are still an order of magnitude larger than their electrical counterparts because of the large bend radius, large core size, and limited mode confinement of current, "low delta-n" (low refractive index differential) planar optical circuits. For example, planar waveguide cores that have the same mode field diameter of current telecommunications fiber can cause an 8×8 optical switch with power equalization to consume an entire 100 mm wafer. The reason large core size and low index contrast between the core and cladding are presently used in the current generation of OICs is to achieve a mode match between the current single mode optical fiber used in the networks and the OIC. Such mode matching achieves low coupling loss between the OIC and the optical fibers that connect it to the rest of the network. However, only limited density per wafer can be achieved in such OICs. Consequently, there is a desire to increase the index contrast to allow better utilization of wafer surface real estate and thus permit higher levels of functionality to be achieved. Such high index contrast OICs are often referred to as "high delta-n" waveguides, referring to a large (e.g., 2%-10%) difference between the core and cladding refractive indices in the OIC planar waveguides.

To achieve high packing density in optical circuits, the difference in refractive index between the core and the cladding should be increased so that the core size may be reduced. Accordingly, high delta-n waveguides allow for decreased core size and tighter turning radii at equal energy loss, and allow for less crosstalk for closely spaced waveguides due to better mode confinement in the core. In addition, since the core in a high delta-n waveguide may be thinner and the mode is more tightly confined, the thickness of the core and cladding layers used to make the planar waveguide of the OIC become thinner. This can reduce the costs and challenges in fabricating a high delta-n OIC, especially those made using traditional inorganic glasses that utilize etched cores.

Despite such potential benefits, high delta-n waveguides yet remain to be adopted due to a number of challenges. One of the greatest challenges preventing the commercial use of high delta-n waveguides is that high delta-n waveguides are not well suited for direct coupling to commonly used single mode optical fiber that typically has a 7 μm to 9 μm mode field diameter. The lack of compatibility between such components is understood in terms of optical mode theory.

Planar optical waveguides, including high delta-n waveguides, and optical fiber waveguides useful in high-speed and long-haul optical transmission systems often are designed to support a single mode. Stated differently, the waveguides are designed such that the wave equation has one discrete solution; although an infinite number of continuous solutions (propagation constants) may be had. The discrete solution is that of a confined mode, while the continuous solutions are those of radiation modes.

Because each waveguide will have a different discrete (eigenvalue) solution for its confined mode, it is fair to say that two disparate waveguides, such as an optical fiber and a planar waveguide, generally will not have the same solution for a single confined mode. As such, in order to improve the efficiency of the optical coupling, it is necessary to have a waveguide transition region between the planar waveguide of the OIC and the optical fiber. This transition region ideally enables adiabatic compression or expansion of the mode so that efficient coupling of the mode from one type of waveguide to another can be carried out.

As mentioned, optical fibers typically support mode sizes (electromagnetic field spatial distributions) that are much larger, both in the horizontal and vertical directions than modes supported by high delta-n waveguide structures, such as planar waveguides. Therefore, a challenge is to provide a waveguide transition region that enables adiabatic expansion of the mode so that it is supported by the optical fiber. Moreover, it is useful to achieve the adiabatic expansion of the mode in both the horizontal and vertical directions. Fabricating a waveguide to effect adiabatic expansion of the mode in the vertical direction has proven difficult using conventional fabrication techniques. For example, tapering the thickness of the waveguide to effect the vertical adiabatic expansion of the mode is exceedingly difficult by conventional techniques.

Consequently, there remains a need in the field for devices for effecting efficient coupling between waveguides having disparate characteristic modes, such as mode mismatch between high delta-n waveguides, (e.g., ridge lasers and silicon-on-insulator (SOI) rib waveguides), asymmetric mode devices, and prevailing (low) delta-n waveguides (e.g., single mode fiber).

SUMMARY OF THE INVENTION

According to an exemplary embodiment of the present invention an optical device is disclosed comprising a single-mode waveguide which supports a first optical mode in a first region and a second optical mode in a second region, the waveguide including a guiding layer having at least one wing extending outwardly from the guiding layer. Desirably, the waveguide may have two wings so that the waveguide may have a cross-sectional shape of a rib waveguide for coupling an optical device of the present invention to a rib waveguide device. The wings may decrease in width along the length of the guiding layer to convert a mode from a rib waveguide mode to a channel waveguide mode. The waveguide may also include a guiding layer having a lower portion with a first taper and an upper portion with a second taper. The lower portion of the guiding layer may taper from a first width to a second width, and the upper portion may taper from the first width to a point. The guiding layer made desirably be provided as a single material layer.

BRIEF DESCRIPTION OF THE DRAWINGS

The foregoing summary and the following detailed description of the preferred embodiments of the present invention will be best understood when read in conjunction with the appended drawings, in which.

DEFINED TERMS

Figure 1:
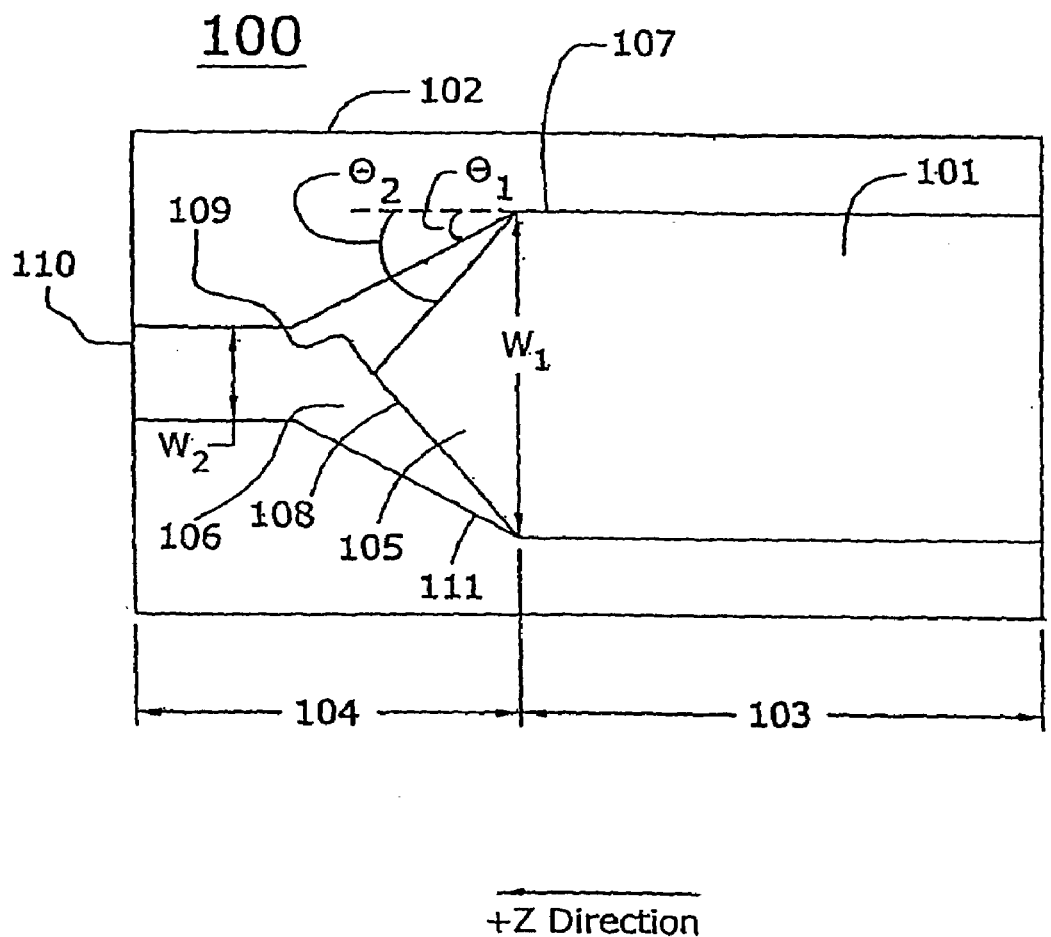
FIG. 1(a) is a top view of waveguide according to an illustrative embodiment of the present invention.
FIG. 1(b) is a perspective view of the waveguide shown in FIG. 1(a)
FIG. 1(c) is a side elevational view of the waveguide of FIG. 1(a) of a waveguide according to an illustrative embodiment of the present invention.
Figure 1:
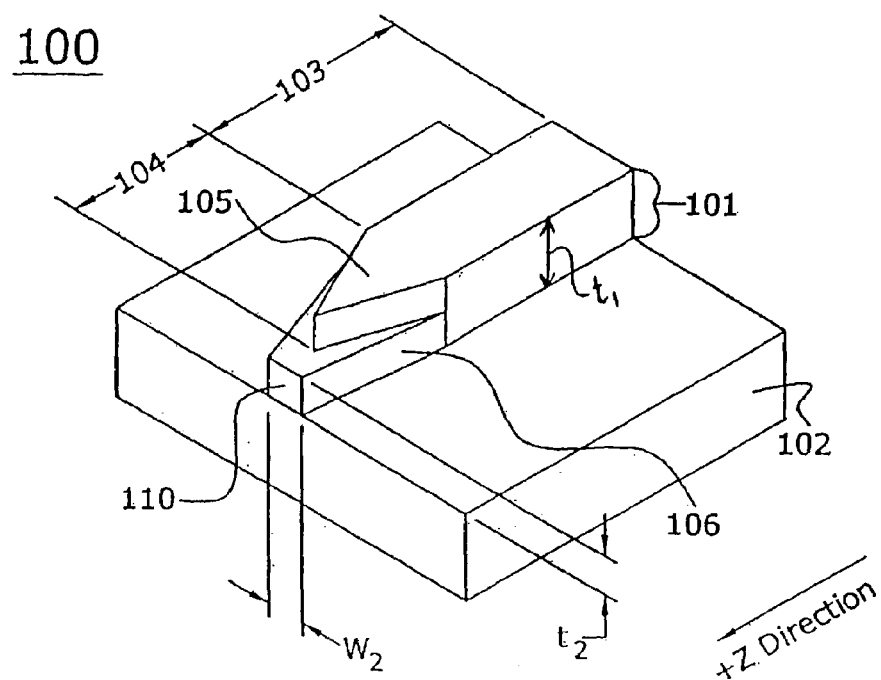
Figure 1:
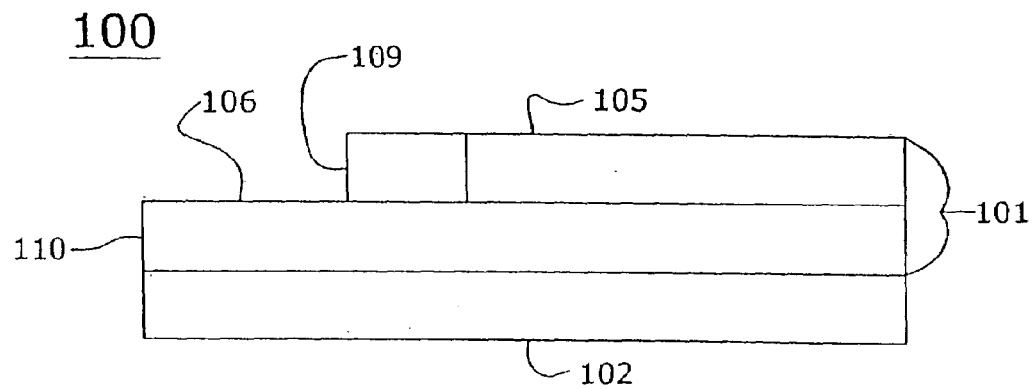

1. As used herein, the term "on" may mean directly on or having one or more layers therebetween.

2. As used herein, the term "single material" includes materials having a substantially uniform stoichiometry. These materials may or may not be doped. Illustrative materials include, but are in no way limited to silicon, $SiO_xN_y$, $SiO_x$, $Si_3N_4$ and InP. Moreover, as used herein, the term single material includes nanocomposite materials, organic glass materials.

3. As used herein, the term "bisect" may mean to divide into two equal parts. Alternatively, the term "bisect" may mean to divide into two unequal parts.

DETAILED DESCRIPTION OF THE INVENTION

In the following detailed description, for purposes of explanation and not limitation, exemplary embodiments disclosing specific details are set froth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the present invention relates to an optical waveguide which fosters adiabatic mode expansion/compression thereby enabling optical coupling between a first waveguide, which supports a first optical mode and a second waveguide, which supports a second optical mode. According to an exemplary embodiment, the waveguide supports a first optical mode in a first region and a second optical mode in a second region. The waveguide of the present invention illustratively couples a planar waveguide, such as a channel waveguide or a rib waveguide, of the OIC to an optical fiber or another waveguide of an optical communications system. The waveguide may include a single material guiding layer having a lower portion with a first taper and an upper portion with a second taper. According to another exemplary embodiment of the present invention, an optical device is disclosed which includes a waveguide having a single material guiding layer. The single material guiding layer has a lower portion, which tapers from a first width to a second width, and an upper portion which tapers from the first width to a point.

The single material may be disposed on a stress compensating layer, which is used to reduce stress induced polarization mode dispersion and temperature induced polarization mode dispersion. This stress compensating layer will not substantially impact the optical characteristics of a waveguide. According to yet another exemplary embodiment of the present invention, an optical device is disclosed which includes a waveguide having a guiding layer with two wings extending outwardly from the guiding layer. The wings are provided at a selected end of the waveguide to provide an endface of the waveguide well-suited to coupling to a rib waveguide of the OIC.

The waveguide according to exemplary embodiments described herein may be an integral part of an OIC formed during the fabrication of the OIC. Of course, multiple waveguides may be used to couple multiple optical fibers at various locations of the OIC. For example, an 8 channel fiber array could be efficiently coupled to a 8 channel SOI waveguide by utilizing a device incorporating multiple waveguides of the present invention. Such a configuration prevents the need for expensive up-tapers in the SOI waveguide by solving the mode matching challenges in one interposer chip of the present invention.

Referring now to the figures, FIGS. 1(a) and 1(b) show a waveguide 100 according to an illustrative embodiment of the present invention. A guiding layer 101 is disposed on a lower cladding layer 102. The guiding layer 101 is illustratively a single material. An upper cladding layer (not shown) covers the guiding layer 101. The indices of refraction of the upper and lower cladding layers may or may not be the same. In all cases, the indices of refraction of the upper and lower cladding layers are less than the index of refraction ($n_g$) of the guiding layer 101. The waveguide 100 includes a first region 103 and a second region 104. The guiding layer 101 further includes an upper portion 105 and a lower portion 106. The upper portion 105 tapers at an angle $\theta_2$ relative to the edge 107 of the guiding layer 101. The lower portion 106 tapers at an angle $\theta_1$ relative to the edge 107 of the guiding layer 101.

Reducing the thickness and width of the guiding layer 101 effects substantially adiabatic expansion/compression of an optical mode traversing the waveguide. (As would be readily apparent to one having ordinary skill in the art, adiabatic expansion of a mode occurs when the mode is traveling in the +z-direction; while from the reciprocity principle of optics, adiabatic compression occurs when the mode is traveling in the −z-direction). As the width of the guiding layer 101 reduces along a first taper 108 from a width $w_1$ to effectively zero width the termination point 109, the effective index of refraction is reduced Moreover, the guiding layer 101 reduces along second taper 111 from a width $w_1$ to a width $w_2$, a finite width, at endface 110. Again, the effective index of refraction decreases as the width of the guiding layer 101 decreases. Due to the reduction in the effective index of refraction, the horizontal portion of the optical mode expands (is less confined in the guiding layer 101) as the mode traverses the waveguide in the +z-direction. Fabrication of the first taper 108 and second taper 111 of the guiding layer 101 may be carried out by well known techniques, as described in further detail below.

Of course, it is also useful to adiabatically expand/compress the vertical portion of the optical mode. In order that the vertical portion of the optical mode undergoes substantially adiabatic expansion/compression, the thickness of the guiding layer is reduced.

Turning to FIG. 1(c), a side elevational view of the illustrative embodiment of FIG. 1(a) is shown. In this embodiment, the thickness of guiding layer 101 reduces in the +z-direction from a thickness $t_1$ to a thickness $t_2$ as shown. An upper cladding layer (not shown) may cover the guiding layer 101. While the single material used for guiding layer 101 has an index of refraction $n_g$ as the thickness of the guiding layer 101 is reduced from a thickness $t_1$ to a thickness $t_2$, the effective index of refraction is reduced. Accordingly, the vertical portion of an optical mode traversing the guiding layer 101 in the +z-direction will expand, as it is less confined to the guiding layer 101. Finally, according to the illustrative embodiment of the present invention shown in FIGS. 1(a) and 1(b), the endface 110 of the guiding layer 101 has a width $w_2$, thickness $t_2$ and index of refraction that produce an optical mode well matched to that of an optical fiber. Accordingly, the single optical mode supported by the waveguide 100 at endface 110 will also be one which is supported by an optical fiber. As such, good optical coupling between the guiding layer 101 of the waveguide 100 and the guiding layer of an optical fiber (not shown) results.

The waveguide 100 according to exemplary embodiments of the present invention may be fabricated so that the upper portion and lower portion of the guiding layer 101 are symmetric about a plane which longitudinally bisects the guiding layer 101. Alternatively, the waveguide 100 according to exemplary embodiments of the present invention may be fabricated so that the upper portion, or the upper portion and the lower portion, of the guiding layer 101 are asymmetric about an axis which bisects the waveguide 100. In addition, a waveguide according to exemplary embodiment of the present invention may be fabricated to include one or more wings extending outwardly from the guiding layer. The wings may be disposed at an endface of the waveguide so that that endface is particularly suited to coupling to a rib waveguide. These and other exemplary embodiments of the present invention are described in the examples described below.

EXAMPLE I

Figure 2:
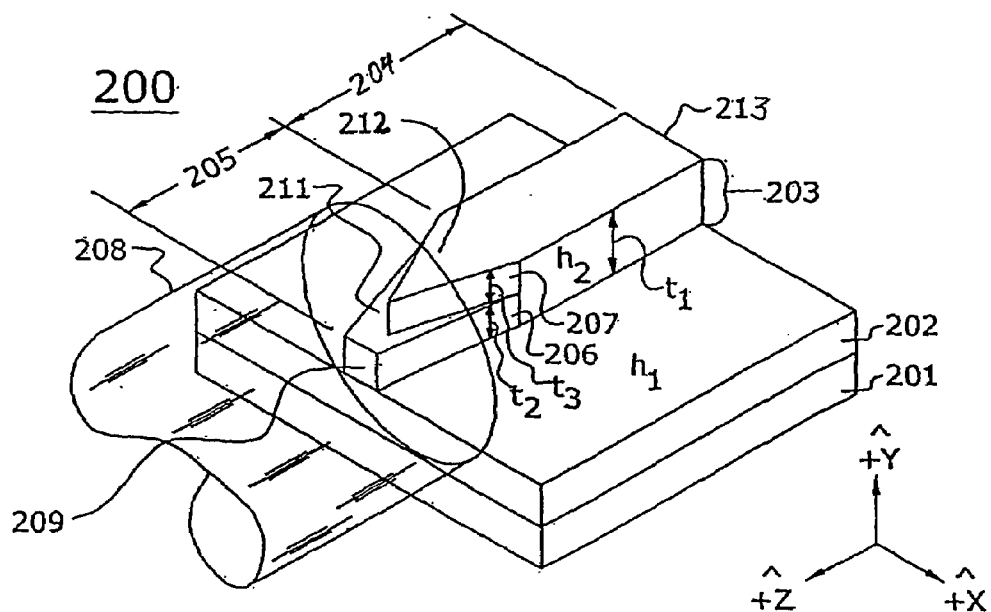
FIG. 2(a) is a perspective view of a waveguide coupled to an optical fiber in accordance with an illustrative embodiment of the present invention.
FIG. 2(b) is a top view of a waveguide according to an illustrative embodiment of the present invention.
Figure 2:
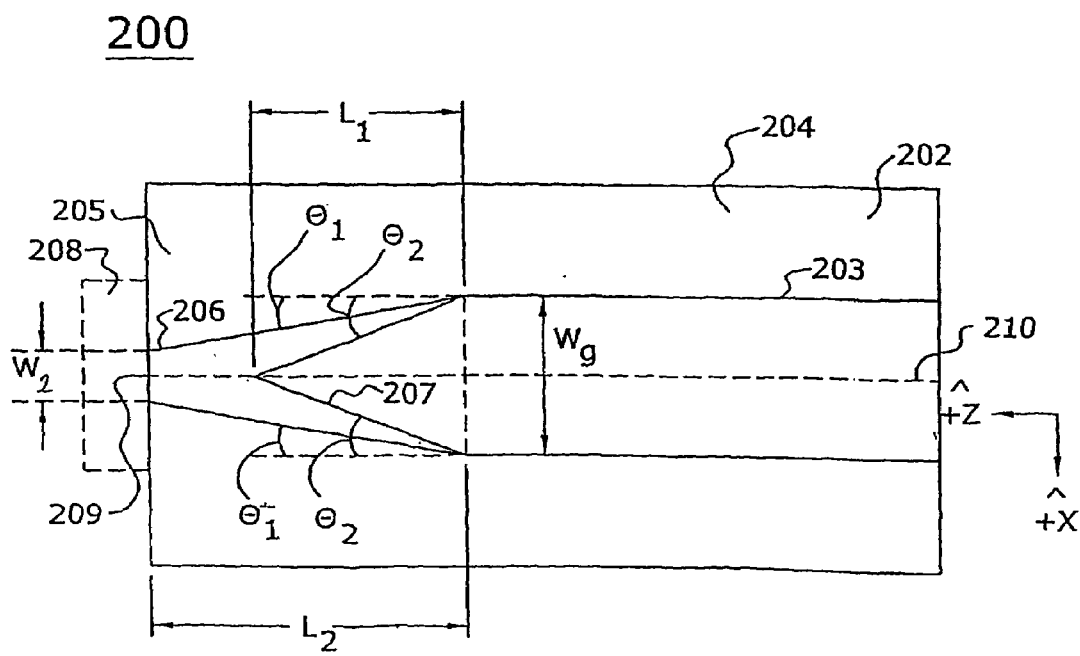

Turning to FIG. 2(a), a perspective view of a waveguide 200 according to an exemplary embodiment of the present invention is shown. A lower cladding layer 202 is disposed on a substrate 201. A guiding layer 203 is disposed on lower cladding layer 202. Waveguide 200 has a first region 204 and a second region 205. The guiding layer 203 includes a lower portion 206 and an upper portion 207. An optical mode is coupled from an endface 209 to an optical fiber 208. For the purposes of ease of discussion, an upper cladding layer is not shown in FIG. 2(a). This upper cladding layer would cover the guiding layer 203. The upper cladding layer, guiding layer 203 and lower cladding layer 202 form a waveguide 200 according to an illustrative embodiment of the present invention. The upper cladding layer may have the same index of refraction as the lower cladding layer 202. Alternatively, the upper cladding layer may have a higher (or lower) index of refraction as the lower cladding layer 202. The guiding layer 203 has an index of refraction, $n_g$, which is greater than the indices of refraction of both the upper cladding layer and lower cladding layer 202. Finally, according to the illustrative embodiment of the present example of the invention, the upper portion 207 and lower portion 206 are symmetric about an axis 210 that bisects guiding layer 200, as shown in FIG. 2(b).

As mentioned above, it may be desirable to couple an optical fiber 208 to an OIC (not shown). This coupling may be achieved by coupling the optical fiber to a planar waveguide (not shown) of the OIC. However, the planar waveguide supports a first optical mode and the optical fiber 208 supports a second optical mode. As such, the first optical mode of the planar waveguide will not be support by the optical fiber in an efficient manner, and a significant portion of the energy of the first optical mode of the planar waveguide could be transformed into radiation modes in the optical fiber 208.

Waveguide 200 may be disposed between the planar waveguide of the OIC and the optical fiber 208 to facilitate efficient optical coupling therebetween. To this end, as described in detail above, the first optical mode of the planar waveguide is physically more confined to the guiding layer of the planar waveguide than the second optical mode is in the guiding layer of the optical fiber. That is, the confined mode of the planar optical waveguide is smaller than the confined mode of an optical fiber. Accordingly, waveguide 200 is useful in efficiently transferring the energy of the first optical mode of the planar waveguide into optical fiber 208 by substantially adiabatic expansion of the mode. Stated differently, the solution to the wave equation for the planar waveguide is a first optical mode. As the supported mode of the planar waveguide traverses the waveguide 200 is undergoes a transformation to a second optical mode that is supported by a cylindrical optical waveguide (optical fiber 208).

Advantageously, the transformation of the mode which is supported by the planar waveguide, to a mode which is supported by waveguide 200, and ultimately to a mode which is supported by optical fiber 208, is substantially an adiabatic transformation. As such, transition losses from the planar waveguide to the optical fiber 208 are minimal. Illustratively, transition losses are approximately 0.1% or less. Moreover, the second region 205 of the waveguide 200 effects both horizontal and vertical transformation of the mode. Finally, the above discussion is drawn to the adiabatic expansion of a mode in waveguide 200. Of course, from the principle of reciprocity in optics, a mode traveling from optical fiber 208 (−z-direction) to a planar waveguide would undergo an adiabatic compression by identical principles of physics.

FIG. 2(b) shows a top-view of the waveguide 200 of FIG. 2(a). The guiding layer 203 of waveguide 200 includes a first region 204 which is coupled to (or is a part of) another waveguide, such as a planar waveguide (not shown). The second region 205 is the region in which the transformation of the mode supported in the planar waveguide into one which is supported by another waveguide (e.g. optical fiber 208) occurs. This second region 205 includes a lower portion 206 and an upper portion 207. Upon reaching the end face 209, the single confined mode is one which is supported by optical fiber 208. Accordingly, a significant proportion of the energy of the mode is not lost to radiation modes in the optical fiber. In summary, the structure of the illustrative embodiment of FIG. 2(a) and FIG. 2(b) results in efficient coupling of both the horizontal portion and the vertical portion of the optical mode. The structure is readily manufacturable by standard semiconductor fabrication techniques.

As shown in FIG. 2(b), as the guiding layer 203 tapers, the lower portion 206 is at a first angle, $\theta_1$, relative to the edge of waveguide 203; and the upper portion 207 at a second angle, $\theta_2$, again relative to the edge of waveguide 203. Illustratively, the angles are in the range of approximately 0° to approximately 0.5°. Sometimes, it is preferable that the angles are in the range of greater than 0° to approximately 0.5°. As can be readily appreciated by one having ordinary skill in the art, the greater the angle of the taper, the shorter the length of the taper. Contrastingly, the smaller the taper angle, the longer the length of the taper. As will be described in greater detail herein, a greater taper length may require more chip area, which can be disadvantageous from an integration perspective, but may result in a more adiabatic transformation (expansion/compression) of the mode. Ultimately, this may reduce transition losses and radiation modes in the second region 205 of the waveguide and the optical fiber 208, respectively. Finally, it is of interest to note that angle $\theta_1$, and the angle $\theta_2$ are not necessarily equal. Illustratively, the angle $\theta_2$ may be greater than angle $\theta_1$.

The length of taper of lower portion 206 (shown in FIG. 2(b) as $L_2$) is on the order of approximately 100 µm to 1,500 µm. Of course, FIG. 2(b) is not drawn to scale as the width of the waveguide (shown as $w_g$) is hundreds of times smaller than the length $L_2$ of the taper portion (e.g. 1-10 microns wide). The length of the taper of the upper portion 207 of the waveguide (shown at $L_1$) is on the order of approximately 100 µm to approximately 1,500 µm. As described above, smaller taper angles will result in longer taper lengths ($L_1$) and consequently may require more chip surface area, which can be less desirable in highly integrated structures. However, the length of the taper ($L_1$) also dictates the efficiency of the mode shaping. To this end, longer tapers may provide more efficient mode shaping because the mode transformation is more adiabatic.

In the illustrative embodiment of FIGS. 2(a) and 2(b), the upper portion 207 and the lower portion 206 of guiding layer 203 are substantially symmetric about an axis 210 that bisects the guiding layer 203. As such, the first angle $\theta_1$ of the lower portion is the same on both sides of the axis 210. Similarly, second angle $\theta_2$ of upper portion is the same on both sides of the axis 210. In the present embodiment in which the upper portion 207 and lower portion 206 are symmetric about axis 210, the lengths $L_1$ and $L_2$ are the same on both sides of the axis 210.

Finally, as described below, the tapering of the waveguide reduces the width ($w_g$) of the guiding layer 203, which enables substantially adiabatic expansion/compression of the horizontal portion of the mode. At the endface, 209, the width is reduced to a width $w_2$ as shown. Illustratively, this width $w_2$ is in the range of approximately 0.5 µm to approximately 2.0 µm. While the embodiment shows that guiding layer 203 terminates at this width rather abruptly, of course, as in the illustrative embodiment of FIGS. 1(a) and 1(b), it is possible to continue the guiding layer 203 at the reduced width, $w_g$, for a finite length, which ultimately terminates at an endface.

Fabrication of the waveguide 200 may be effected by relatively standard semiconductor fabrication process technology. Particularly advantageous is the fact that the guiding layer 203 may be fabricated of a single layer, illustratively a single layer of a single material. To fabricate the device shown illustratively in FIG. 1, a suitable material is deposited in a single deposition step. A conventional photolithographic step is thereafter carried out, and a conventional etch, such as a reactive ion etching (RIE) technique may be carried out to form the waveguide 203 and to define the lower portion 206. The upper portion 207 may be fabricated by a second conventional photolithography/etch sequence.

Alternatively, a monolithic material may be deposited on layer 202, and in the deposition step, the taper in the lower portion 206 of second region 205 may be formed. After the deposition step, the guiding layer 203 may be partially etched to form the taper in the top portion 207. The top portion 207 can be etched by standard dry or wet etch techniques, both isotropically and anisotropically. While the illustrative embodiment described thus far is drawn to the guiding layer 203 being formed of a single layer, it is clear that this waveguide may be formed of multiple layers of a single material as well. To this end, the guiding layer 203 may be comprised of a lower layer which includes the lower portion 206 and an upper layer (not shown) which includes the upper portion 207. In the technique in which two sequential layers are deposited, the top layer is thereafter etched by standard technique to form the taper in the top portion 207 of the second region 205 of the guiding layer 203.

For purposes of illustration, and not limitation, in the illustrative exemplary embodiment, the lower cladding layer 202, is silicon dioxide ($SiO_2$) having an index of refraction on the order of approximately 1.46. The guiding layer 203 is illustratively silicon oxynitride ($SiO_xN_y$), and the upper cladding layer (not shown) is also $SiO_2$. In this illustrative example of materials, in the first region 204, guiding layer 203 has a thickness (shown at $t_1$ in FIG. 2(a)) on the order of approximately 2.0 µm to approximately 4.0 µm. As can be seen in FIG. 2(a), the thickness of guiding layer 203 reduces from $t_1$ to $t_2$. Moreover, as can be seen in FIG. 2(a), at 213 guiding layer 203 has a thickness $t_1$, which is the sum of the thickness $t_3$ of upper portion 207 and thickness $t_2$ lower portion 206. At section 211, the thickness of guiding layer 203 is reduced to $t_2$ which is the thickness of lower portion 206.

While the taper (reduction of the width, $w_g$) of the upper portion 207 and lower portion 206 results in the adiabatic expansion of the horizontal portion of the confined mode, the reduction in the thickness from $t_1$ to $t_2$ results in the adiabatic expansion of the vertical portion of the confined mode. As described above, the reduction of the thickness of the guiding layer 203 results in a reduction in the effective index of refraction ($n_{eff}$) for the vertical portion of the mode. As such, the mode is less confined vertically in the guiding layer 203, and is progressively expanded as it traverses the waveguide 200 in the +z-direction. At endface 209, the mode is effectively matched to the guiding layer characteristics of optical fiber 208. The lower portion 206 has an illustrative thickness ($t_2$) in the range of approximately 1.0 µm to approximately 2.0 µm. Finally, the upper portion 207 illustratively has a thickness ($t_3$) in the range of approximately 1.0 µm to approximately 2.0 µm.

Figure 3:
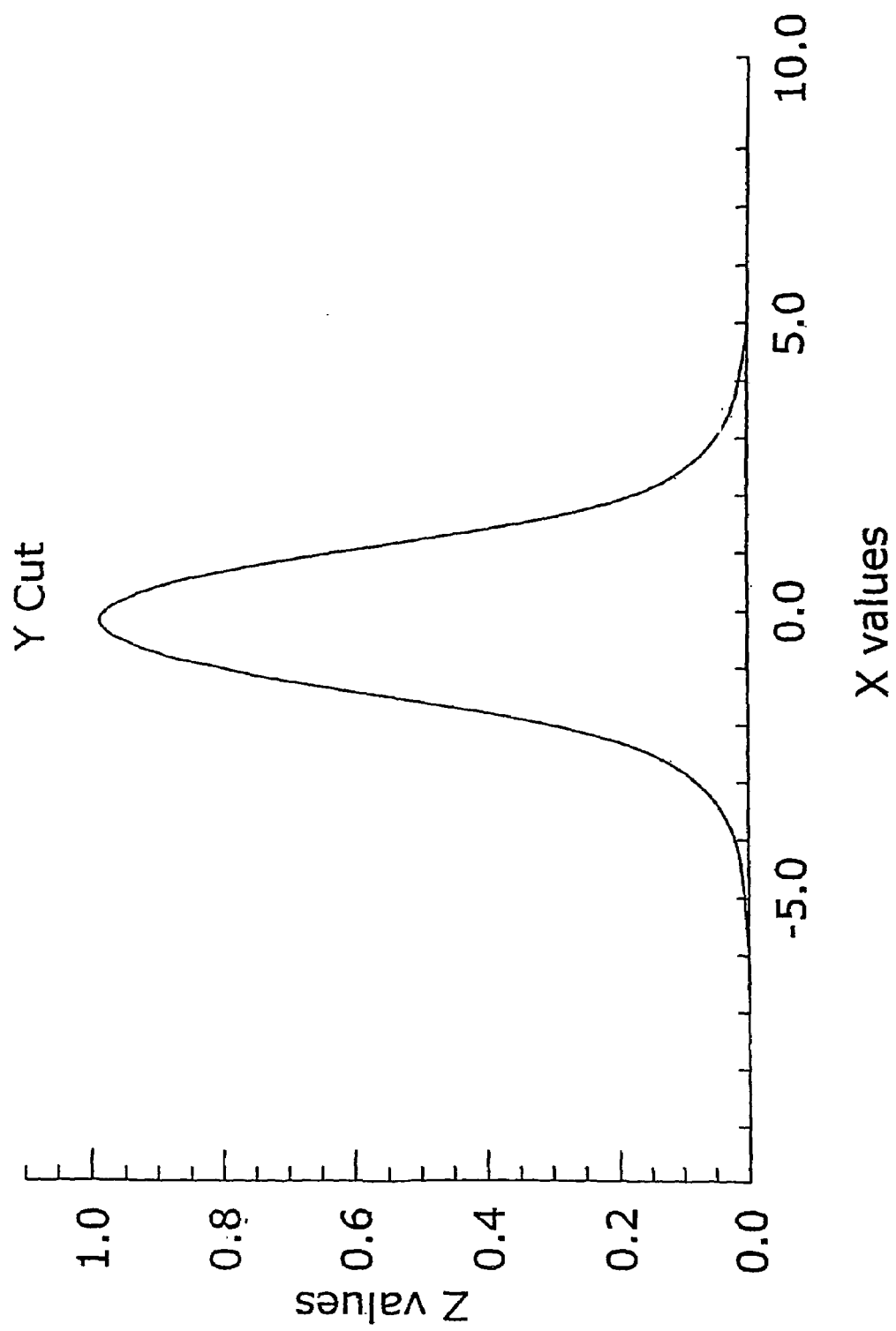
FIGS. 3(a)-3(f) are graphical representations of the electric field distributions of optical modes at various regions of a waveguide according to an illustrative embodiment of the present invention.
Figure 3:
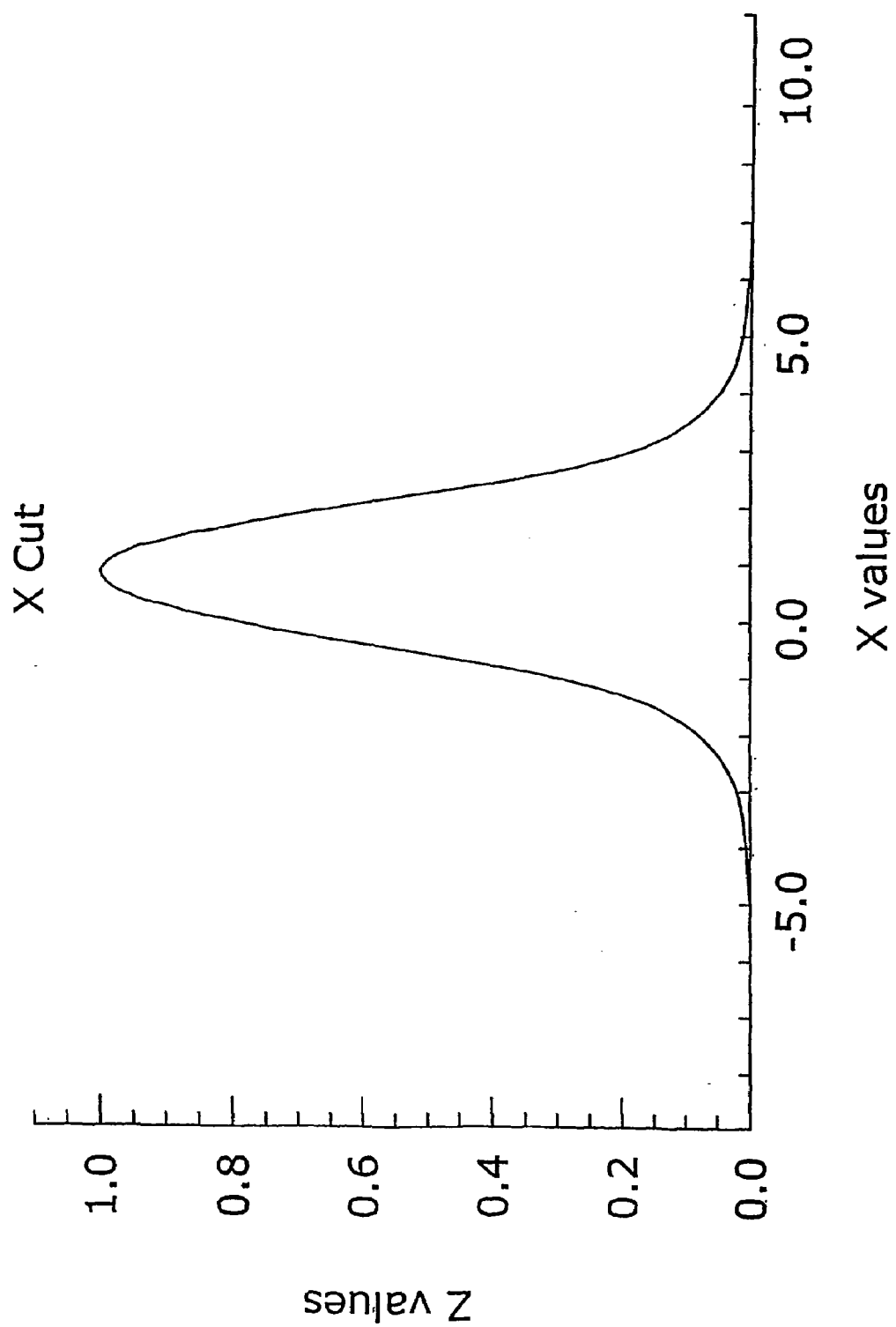
Figure 3:
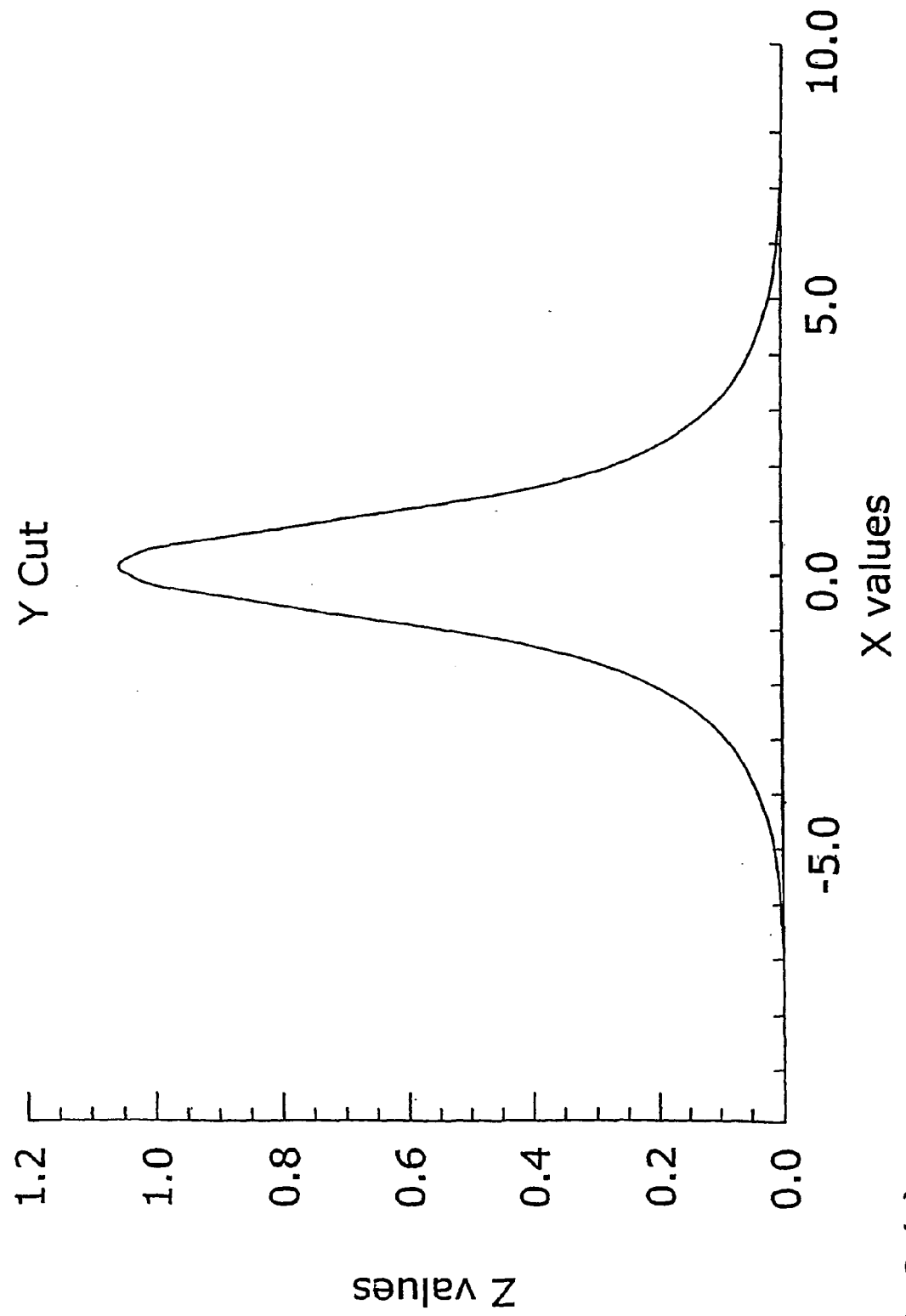
Figure 3:
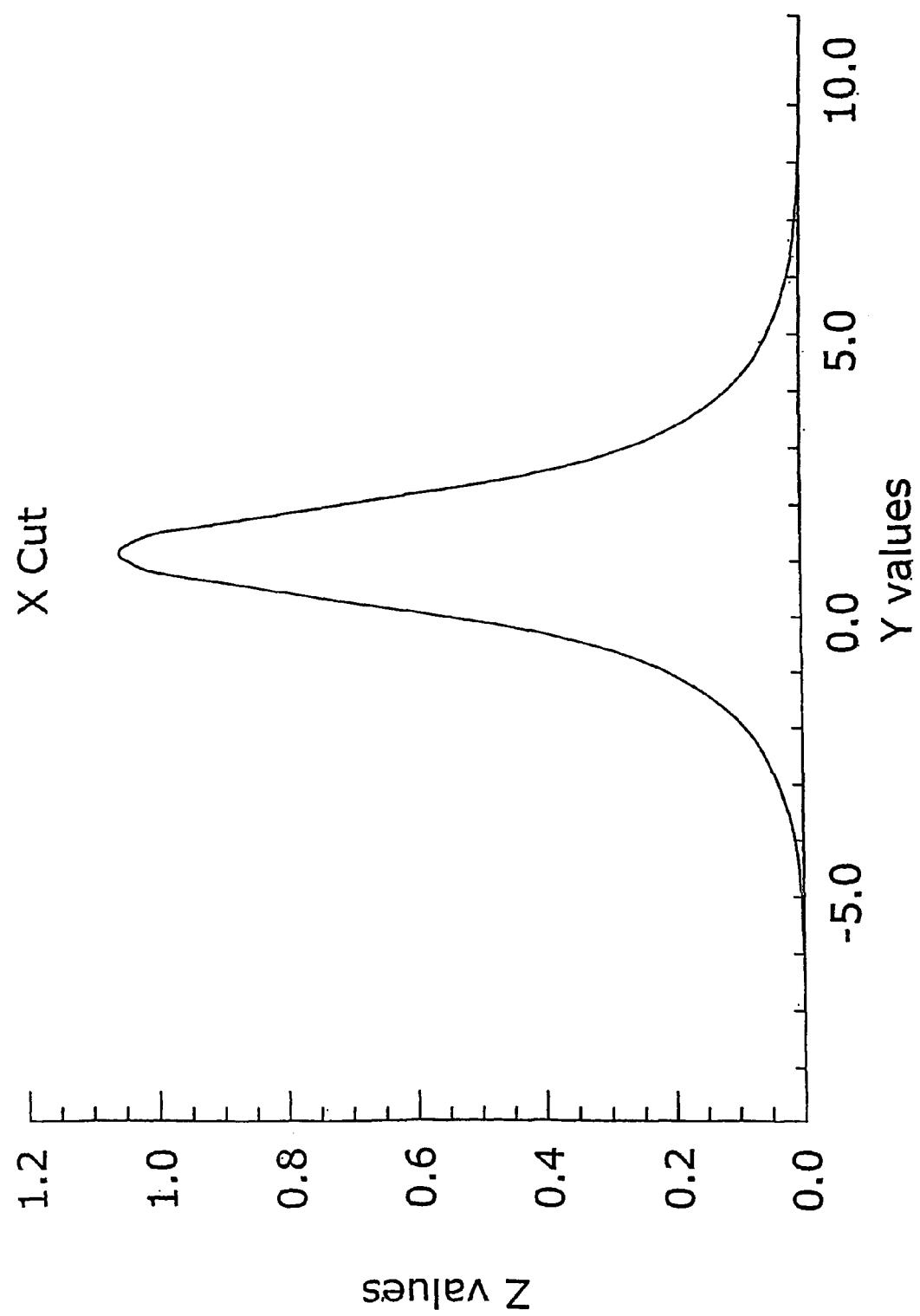
Figure 3:
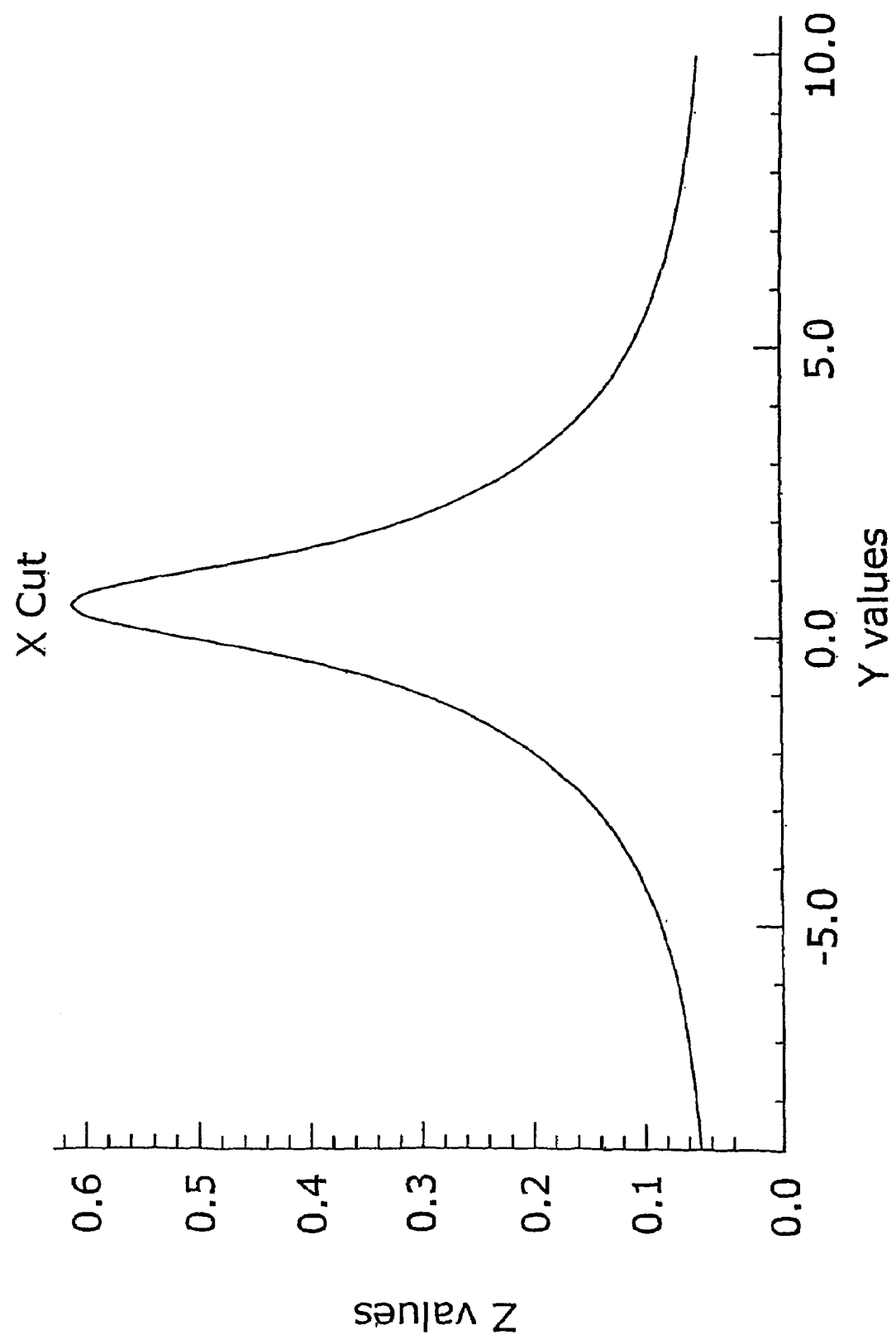
Figure 3:
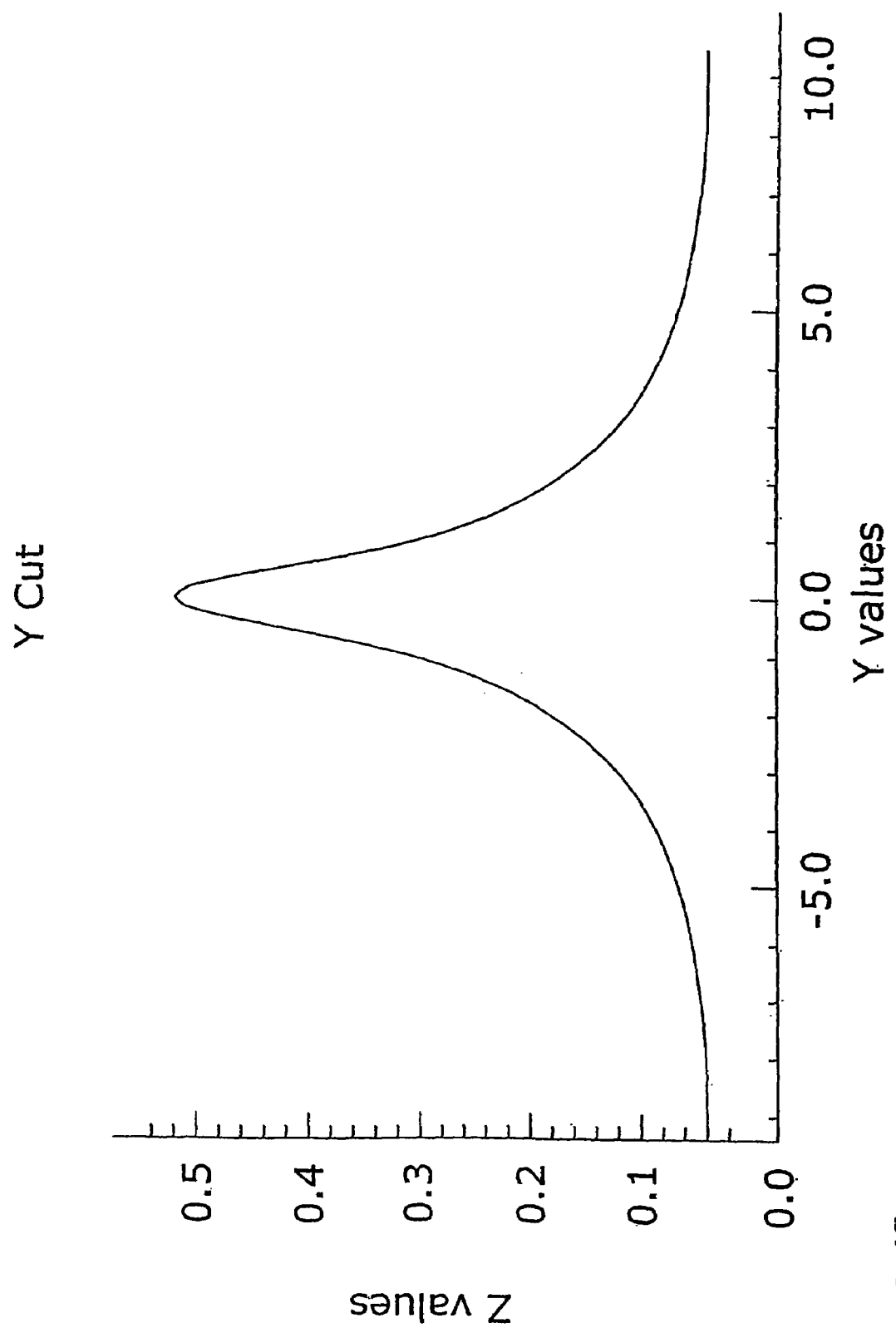

FIGS. 3(a) and 3(b) show the electric field distribution of the confined mode in the first portion 204 of waveguide 200 along the x-axis at a point $z_0$ and along the y-axis at point $z_0$, respectively. Stated differently FIG. 3(a) shows the horizontal portion of the electric field of the confined mode in first region 204, while FIG. 3(b) shows the vertical portion of the electric field of the mode. As can be appreciated, the mode energy is particularly confined in the first region 204 of the waveguide 200. Characteristically, this is an energy distribution of a supported eigenmode of a planar waveguide (not shown), which is readily coupled to the first region 204 of waveguide 200 having virtually the same physical characteristics as the planar waveguide.

FIGS. 3(c) and 3(d) show the electric field of the confined mode in the second region 205 of the waveguide 200, particularly near point 212. More particularly, FIGS. 3(c) and 3(d) show the horizontal and vertical portions of the electric field distribution of the confined mode, respectively, in second region 205 of waveguide 200. As can be seen, the supported mode in this portion of waveguide 200 is slightly expanded (less confined to the guiding layer 203) compared to the supported mode in the first portion 204.

FIGS. 3(e) and 3(f) show the horizontal and vertical portion of the electric field distribution, respectively, of the confined mode at approximately endface 209 of the second region 205 of waveguide 200. At this point, the electric field distribution of the confined mode is significantly greater in both the horizontal direction (FIG. 3(e)) and the vertical direction (FIG. 3(f)). The adiabatic transformation of the mode from the relatively confined mode of the first region 204 to the relatively expanded mode at endface 209 is relatively adiabatic, and results in transition losses which are substantially negligible.

A review of FIGS. 3(a)-3(f) reveals the adiabatic expansion of the confined mode traversing the guiding layer 203 in the +z-direction. As referenced above, the tapers of the lower portion 206 and the upper portion 207 result in a reduction in the width, $w_g$, of guiding layer 203. This results in a reduction in the effective index of refraction ($n_{eff}$) for the horizontal portion of the mode. As such, the horizontal portion of the mode is less confined to the guiding layer 203. Accordingly, the mode is expanded as it traverses the waveguide 200. Additionally, the reduction in the thickness of the guiding layer 203 from $t_1$ to $t_2$ results in a reduction in the effective index of refraction ($n_{eff}$) for the vertical portion of the mode. As such, the mode is less confined in the guiding layer 203. The mode as represented in FIGS. 3(d) and 3(f) will be supported by an optical fiber.

EXAMPLE II

As described above, the upper portion 207 and lower portion 206 of the guiding layer 203 in Example I were substantially symmetric about an axis 210 bisecting the guiding layer 203. In the illustrative embodiments of Example II, the upper portion 407 of the guiding layer 401 may be asymmetric about an axis 413 bisecting the guiding layer 401. The lower portion 402 may be symmetric about the axis 413 bisecting the guiding layer 401. Alternatively, both the upper portion 407 and the lower portion 402 may be asymmetric about an axis 413 bisecting the guiding layer 401. The asymmetry of either the upper portion 407 of the guiding layer 401 alone or of the upper and lower portions 407 of the guiding layer 401 about an axis 413 which bisects the guiding layer 401 may be beneficial from the perspective of manufacturing and fabrication.

In the illustrative embodiments described in this example, the asymmetry of the taper of either the upper portion 407 or the upper portion 407 and lower portion 401 of the guiding layer 401 offers more tolerance during fabrication. To this end, mask positioning tolerances are greater when fabricating tapers that are asymmetric. It is of interest to note that standard masking and etching steps described in connection with the illustrative embodiments in Example I may be used in fabricating the waveguides of the illustrative embodiments of the present example. Moreover, as described in connection to the illustrative embodiments of Example I, waveguides according to the illustrative embodiment facilitate efficient optical coupling between two waveguides by adiabatically expanding/compressing an optical mode. Again, waveguides according to the exemplary embodiments of Example II illustratively couple optical fibers of an optical communication system to planar waveguides of an OIC.

Figure 4:
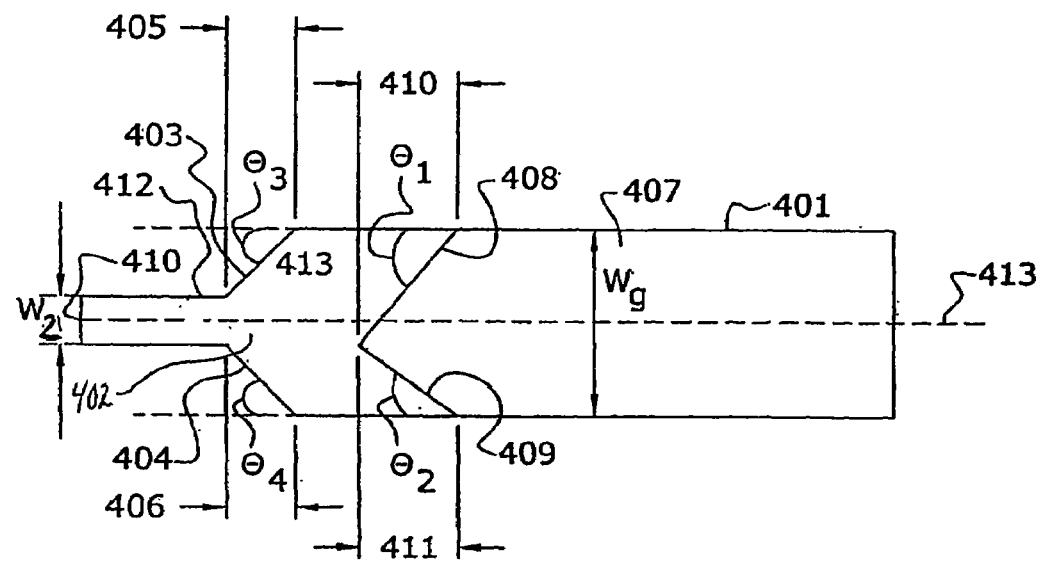
FIGS. 4(a)-4(d) are top views of guiding layers of waveguides in accordance with illustrative embodiments of the present invention.
Figure 4:
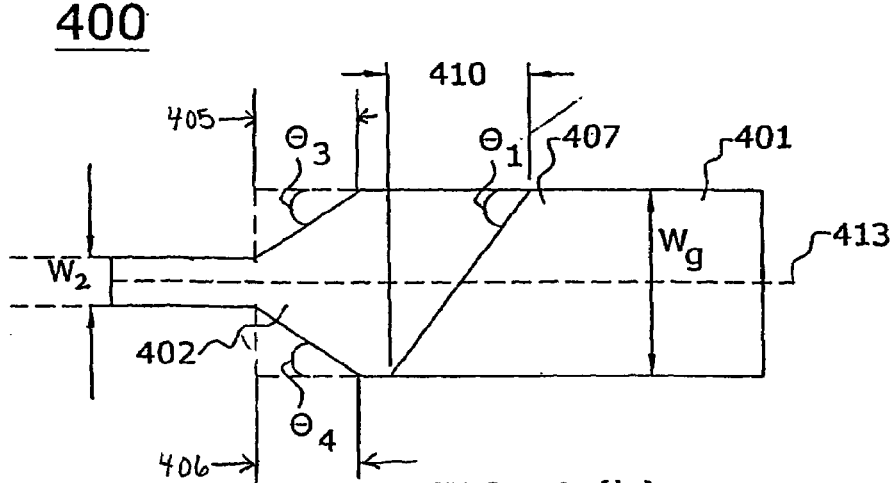
Figure 4:
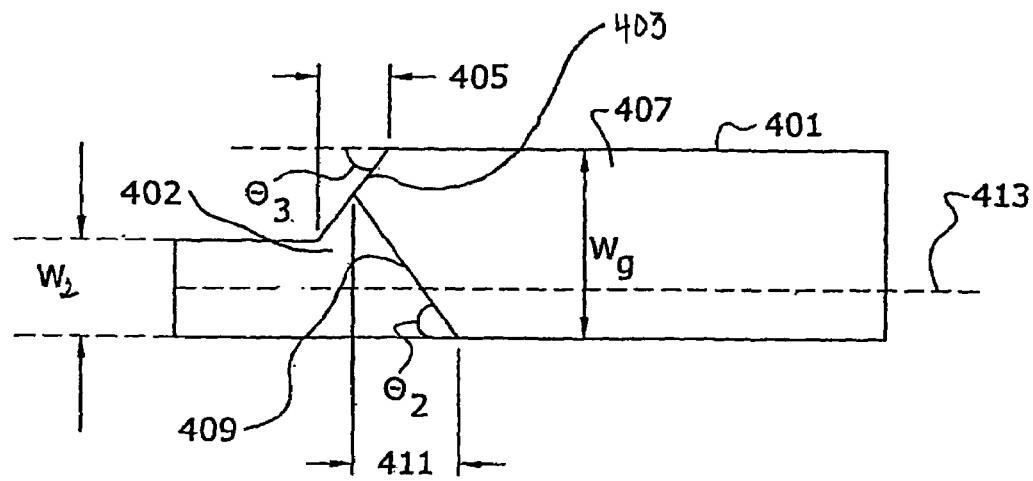
Figure 4:
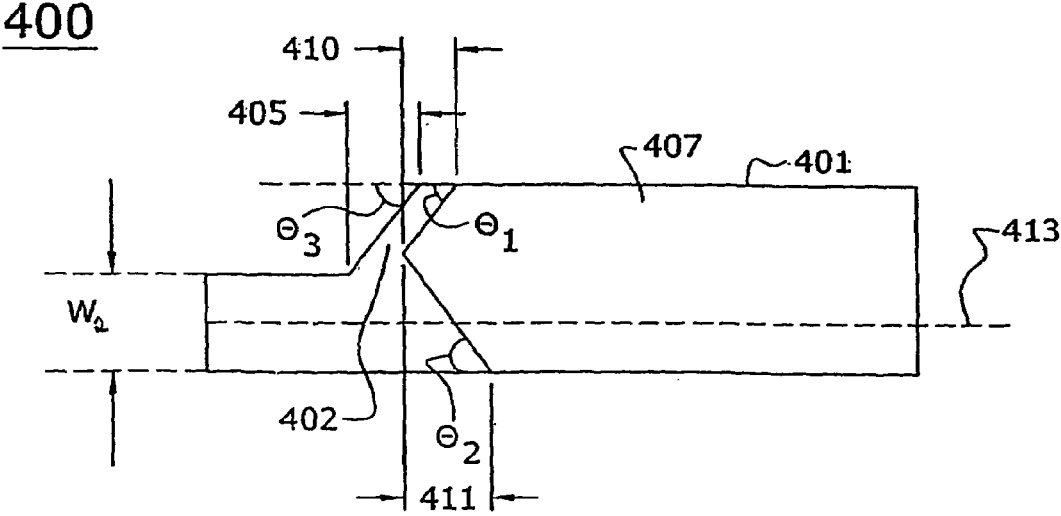

Turning to FIG. 4(a), a top view of guiding layer 401 of a waveguide is shown. Again, a lower cladding layer (not shown) and an upper cladding layer (not shown) may be disposed under and over the guiding layer 401, respectively, thereby forming a waveguide. The upper and lower cladding layers are substantially the same as described in connection with the illustrative embodiments described fully above. A lower portion 402 of guiding layer 401 has a lower portion first taper 403 and a lower portion second taper 404. The lower portion first taper 403 is defined by an angle $\theta_3$ and length 405. The length 405 of the lower portion first taper 403 is readily determined by dropping a perpendicular to the terminal point of the first taper 403. Lower portion second taper 404 is defined by an angle $\theta_4$, a length 406, again defined by dropping a perpendicular to the terminal point. An upper portion 407 of guiding layer 401 is disposed on the lower portion 402. The upper portion 407 of guiding layer 401 is disposed on the lower portion 402. The upper portion 407 has an upper portion first taper 408 which is defined by an angle $\theta_1$ and a length 410, which may be found by dropping a perpendicular from the terminal point of upper portion first taper 408. Similarly, an upper portion second taper 409 of upper portion 407 is defined by angle $\theta_2$ and a length 411, which is determine by dropping a perpendicular from the terminal point of the taper to the edge of the guiding layer 401 as shown. The guiding layer 401 has an illustrative width $w_g$, which decreases to a width $w_2$ at endface 410. Section 412 is illustrative, and the endface having reduced width $w_2$ may be located at the termination of lower portion 402.

In the illustrative embodiment of FIG. 4(a), an axis 413 bisects the guiding layer 401. The upper portion 407 is asymmetric about the axis 413. Contrastingly, the lower portion 402 is substantially symmetric about the axis 413. In the illustrative embodiment of FIG. 4(a), the angles $\theta_3$ and $\theta_4$ are substantially identical. The lengths 405 and 406 of lower portion first and second tapers 403 and 404, respectively, are substantially identical, as well. Advantageously, the constraints on mask location tolerances in forming the upper portion 407 of guiding layer 401 are lessened, when compared to the embodiments described above where the upper portion is symmetric about an axis that bisects the guiding layer 401.

As can be readily appreciated, by varying angle $\theta_3$ of upper portion first taper 403 and length 405 of lower portion first taper 403 and by varying angle $\theta_4$ of lower portion second taper 404 and length 406 of lower portion second taper 404 and by varying angle $\theta_1$ of upper portion first taper 408 and length 410 of upper portion first taper 408 and by varying angle $\theta_2$ of upper portion second taper 409 and length 411 of upper portion second taper 409, a variety of structures for guiding layer 401 may be realized. The results may be that the upper portion 407 is asymmetric about axis 413, while the lower portion 402 is symmetric about axis 413. Alternatively, both upper portion 407 and lower portion 402 of guiding layer 401 may be asymmetric about axis 400. Some illustrative structures are described below. Of course, these are merely exemplary and are in no way limiting of the present invention.

Turning to FIG. 4(b), a top view of an illustrative embodiment of the present invention is shown. In the illustrative embodiment of FIG. 4(b), the lower portion 402 of the guiding layer 401 is substantially symmetric about axis 413. That is, angle $\theta_3$ is substantially identical to angle $\theta_4$, and the length 405 is substantially the same as second length 406. However, angle $\theta_2$ and length 411 are essentially zero. As such, there is no second taper of upper portion 407. Upper portion 407 is substantially defined by $\theta_1$ and length 410. This embodiment is particularly advantageous in that a mask used to define the upper portion 407 need be only semi-self-aligning. That is it need only intersect the lower portion 402, since the taper of upper portion 407 is one-sided and terminates at a point at the edge of lower portion 402. This absence of a second taper results in a lower need for accuracy in mask alignment.

Turning to FIG. 4(c), another illustrative embodiment of the present invention is shown. Guiding layer 401 includes lower portion 402 and upper portion 407. In this illustrative embodiment, angles $\theta_1$ and $\theta_4$ are essentially zero. Upper portion 407 includes upper portion second taper 409 having a taper length 411. Lower portion 402 has a first taper 403 having a taper length 405.

According to this illustrative embodiment, both the upper portion 407 and the lower portion 402 are asymmetric about axis 413 that bisects the guiding layer 401.

Turning to FIG. 4(d), another illustrative embodiment of the present invention is shown. Guiding layer 401 includes lower portion 402 and upper portion 407. In this illustrative embodiment, angles $\theta_1$ and $\theta_4$ are essentially zero. Upper portion 407 includes upper portion second taper 409 having a taper length 411. Lower portion 402 has a first taper 403 having a taper length 405.

According to this illustrative embodiment, both the upper portion 407 and the lower portion 402 are asymmetric about axis 413 that bisects the guiding layer 401.

Turning to FIG. 4(d), another illustrative embodiment of the present invention is shown. In this illustrative embodiment, both the lower portion 402 and the upper portion 407 of the guiding layer 401 are asymmetric about an axis 413 that bisects the guiding layer 401. Again, angles $\theta_1$ and $\theta_2$ in conjunction with lengths 410 and 411, maybe used to define the taper of upper portion 407. Similarly, the angle $\theta_3$ and length 405 may be used to define the taper of the lower portion 402 of guiding layer 401.

As can be readily appreciated from a review of the illustrative embodiments of Example II, the guiding layer may be of a variety of structures. The embodiments described are merely exemplary of the waveguide of the present invention. As such, these exemplary embodiments are intended to be illustrative and in no way limiting of the invention.

EXAMPLE III

In the present example, other illustrative embodiments of the present invention are described. These illustrative embodiments may incorporate the principles of symmetry and asymmetry of the guiding layer as described above. Moreover, many of the fabrication techniques described in connection with the illustrative embodiments of Examples I and II may be used.

Figure 5:
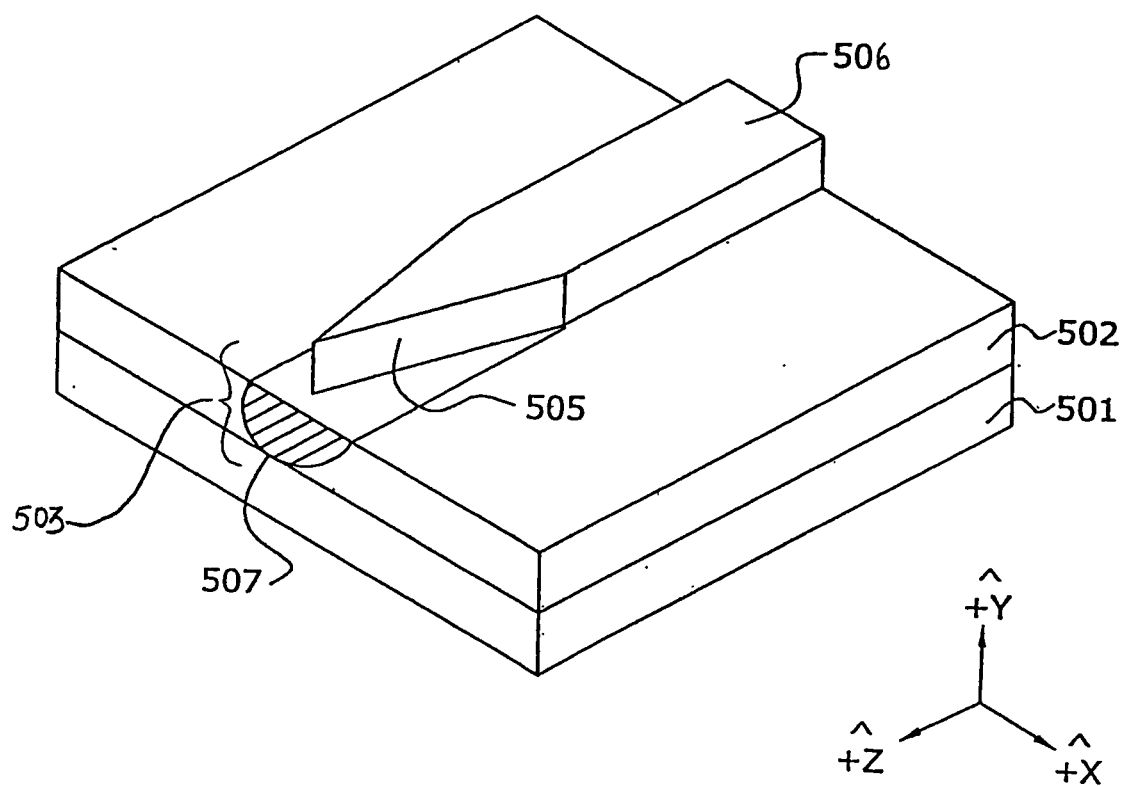
FIG. 5 is a perspective view of an illustrative embodiment of the present invention.

FIG. 5 shows a perspective view according to another illustrative embodiment of the present invention. A waveguide 500 includes a lower cladding layer 502. The lower cladding layer 502 may be disposed on a substrate 501. A guiding layer 503 is disposed on the lower cladding layer 502. An upper cladding layer (not shown) may be disposed on the guiding layer 503. In the embodiment shown in FIG. 5, the lower portion 507 of the guiding layer 503 is a diffused guiding layer. In the particular embodiment shown in FIG. 5, the lower portion 507 is illustratively a $TiLiNbO_3$ waveguide. The top portion 506 of waveguide 503 is a material having an index of refraction that is substantially the same as that of the lower portion 507 (the diffused waveguide). Advantageously, the embodiment shown in FIG. 5 is useful because diffused guiding layers are often wider (along x axis) than they are deep (along y axis). The second region 505 of the top portion 506 is tapered in a manner similar to that shown in previous embodiments, for example that of FIG. 1. The top portion 506 of the second region 505 is useful in providing both vertical and horizontal mode transformation.

Figure 6:
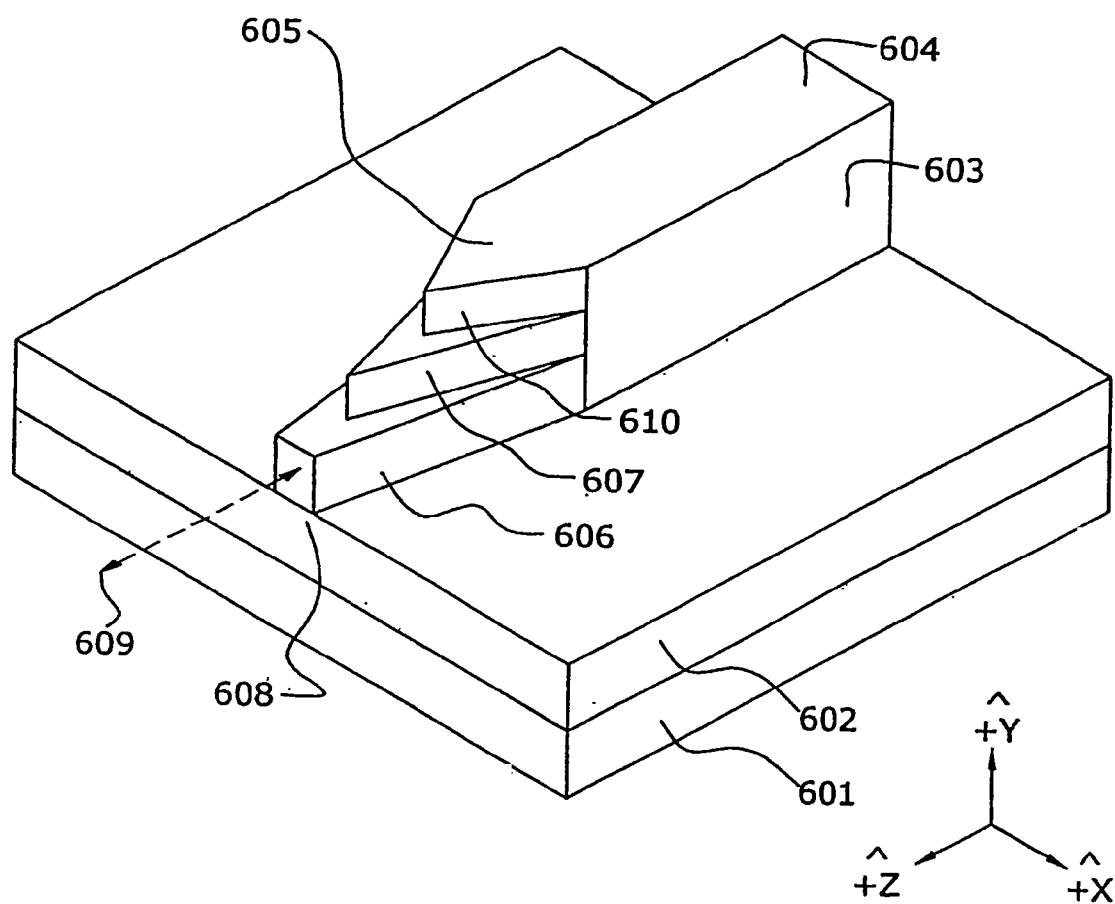
FIG. 6 is a perspective view of an illustrative embodiment of the present invention.

Turning to FIG. 6, another illustrative embodiment of the present invention is shown. In this illustrative embodiment waveguide 600 has a second region 605 that illustratively includes three layers. Of course, this is merely illustrative, and more layers are possible. The substrate 601 has a lower cladding layer 602 disposed thereon. The guiding layer 603 has a first region 604 and a second region 605. The second region 605 has a lower portion 606 and an intermediate portion 607 and a top portion 610. An upper cladding layer 611 (not shown) may be disposed over guiding layer 603. Again, a waveguide couples to the end face 608; and illustratively the waveguide is an optical fiber (not shown). In the illustrative embodiment shown in FIG. 6, the second region 605 is symmetric about an axis 609 which bisects the lower portion 606. The fabrication sequence and materials are substantially the same in the embodiment shown in FIG. 6. Of course, a third photolithography/etching step would have to be carried out in the embodiment in which one layer of material is deposited to form the guiding layer 603. Of course, multiple depositions of the same material could be carried out in a manner consistent with that described in connection with FIG. 1. Thereafter, a sequence of photolithographic and etching steps would be carried out to realize the lower portion 606, intermediate portion 607 and top portion 610 of the second region 605.

EXAMPLE IV

The illustrative embodiments described so far have included configurations particularly suited for coupling to a channel waveguide. In addition, however, as provided in the embodiments of this example, the present invention is equally well-suited to coupling to a rib waveguide. In this regard, embodiments of this example include a waveguide end which has a cross-sectional shape compatible with that of a rib waveguide, as shown for example, in FIG. 7(b).

Figure 7A:
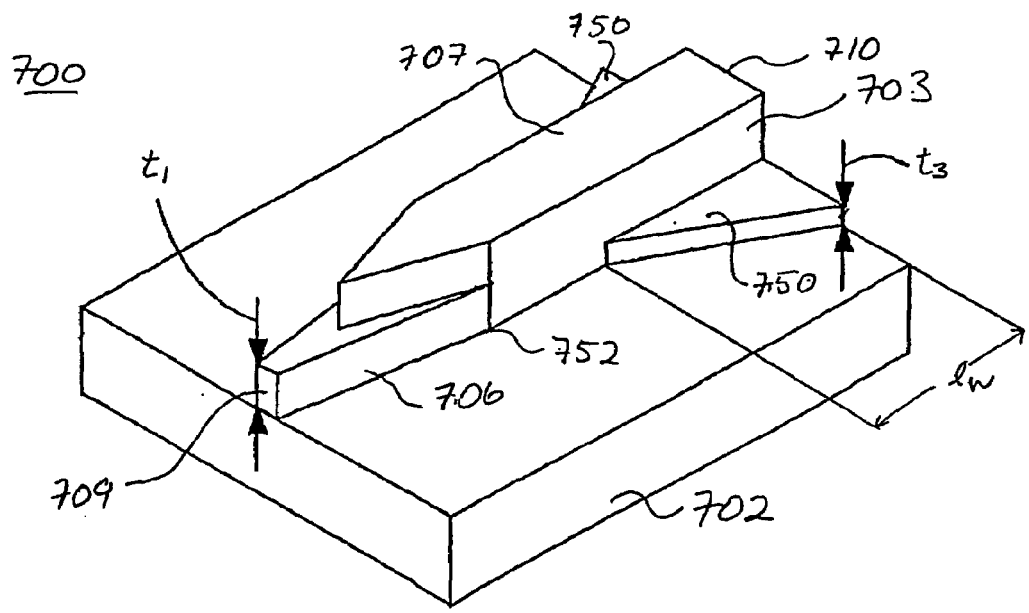
FIG. 7(a) is a perspective view of a waveguide according to an illustrative embodiment of the present invention in which the waveguide includes wings for coupling to a rib waveguide.
Figure 7D:
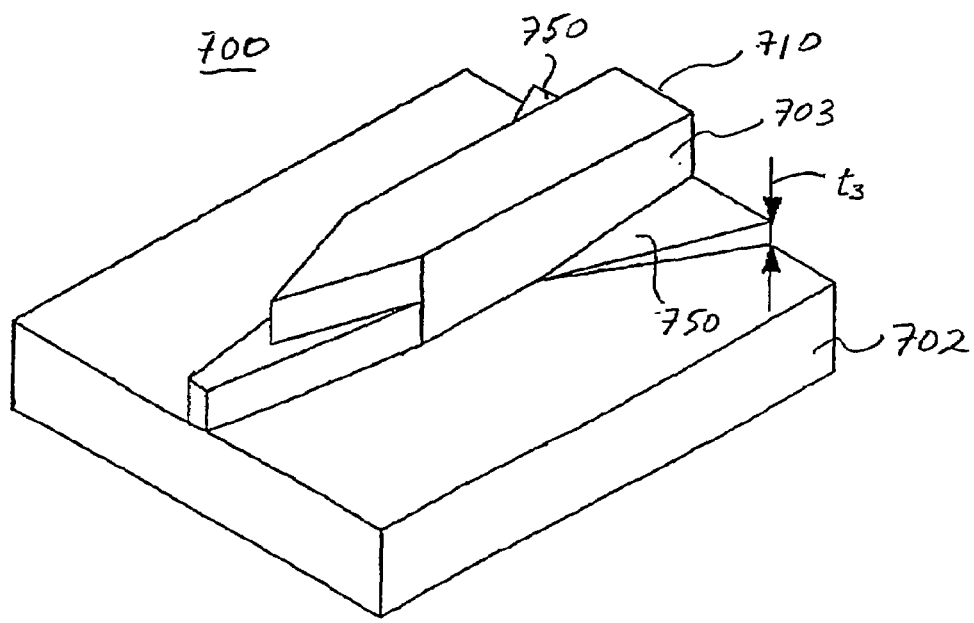
FIG. 7(d) is a perspective view a waveguide similar in configuration to that shown in FIG. 7(a), but having wings of tapered thickness.
Figure 7B:
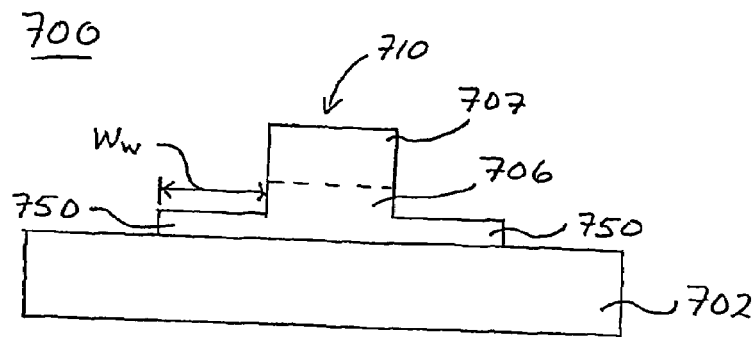
FIG. 7(b) is an end elevational view of the waveguide of FIG. 7(a) showing the end of the waveguide that includes the wings.
Figure 7C:
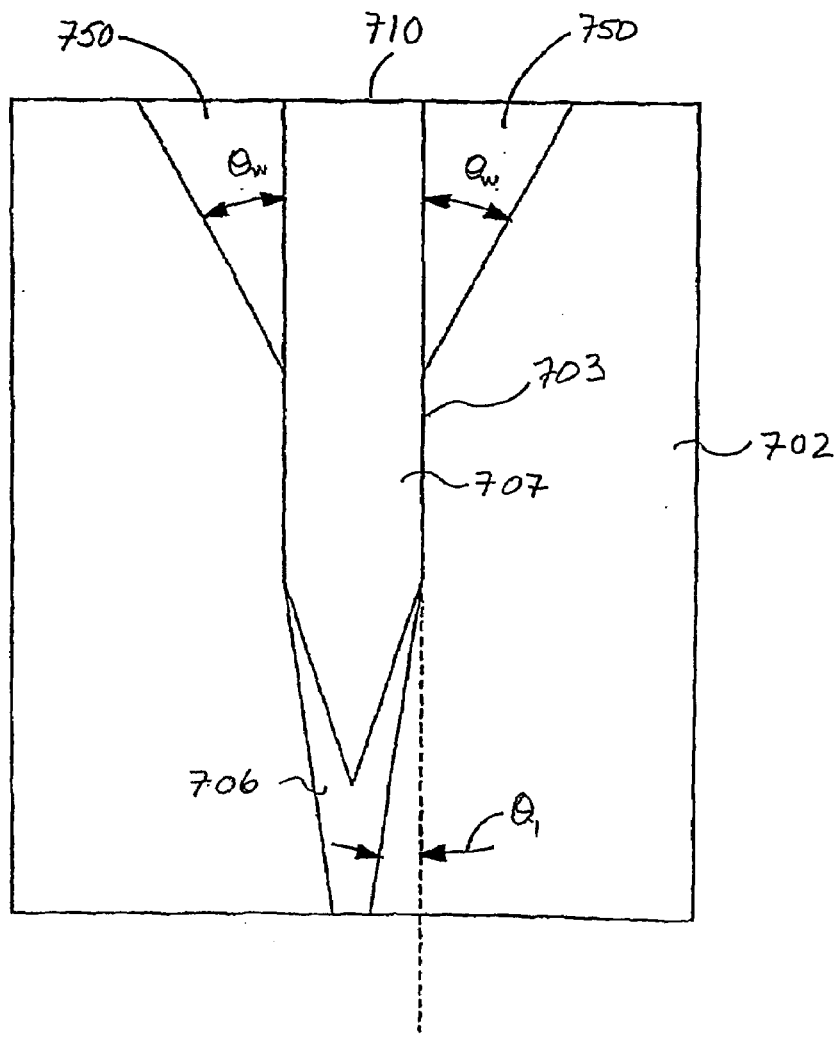
FIG. 7(c) is a top view of the waveguide of FIG. 7(a)

Turning to FIGS. 7(a)-(c) in more detail, a waveguide 700 is shown which includes a guiding layer 703 which has two wings 750 extending outwardly from the guiding layer 703 at an endface 710 of the waveguide 700. The waveguide 700 includes a lower cladding layer 702 on which the guiding layer 703 is disposed. An upper cladding layer (not shown) may be disposed on the guiding layer 703 in a similar manner as described for the above embodiments. The upper cladding layer may have the same index of refraction as the lower cladding layer 702. Alternatively, the upper cladding layer may have a higher (or lower) index of refraction than that of the lower cladding layer 702. The guiding layer 703 has an index of refraction, $n_g$, which is greater than the indices of refraction of both the upper cladding layer and lower cladding layer 702. The guiding layer 703 includes an upper portion 707 and a lower portion 706 which may have the same configuration as that of the above embodiments. For example, the upper and lower portions 707, 706 may be tapered in a manner similar to that shown in previous embodiments, for example that of FIG. 1. Alternatively, the guiding layer 703 may be provided without tapers.

Each wing 750 may be formed of the same material as the lower portion 706 as well as the upper portion 707 to provide a single material structure, as illustrated in the end view of FIG. 7(b). Alternatively, one or both of the wings 750 may comprise a material different from that of lower portion 706 and/or upper portion 707. Each wing 750 has a width, $w_w$, and thickness, $t_3$, at the endface 710 so that the combined structure of the guiding layer 703 and the wings 750 has the cross-sectional shape of a rib waveguide. As such, the portion of the waveguide 700 at the rib end 710 is well-suited to coupling to a rib waveguide, such as one provided on an OIC. The thickness, $t_3$, of the wings 750 may be the same as that of the lower portion 706 or may be different from that of the lower portion 706.

As seen in FIGS. 7(a) and 7(c), the wings 750 decrease in width along the length of the guiding layer 703 to convert a mode in the waveguide 700 from a rib waveguide mode at endface 710 to a channel waveguide mode at the opposing endface 709 of the waveguide 700 (or vice versa depending on the direction of propagation in the waveguide 700). That is, as the width of the wings 750 decrease, energy of an optical mode contained in the wings 750 is transferred into the guiding layer 703, which has a cross-sectional shape of a channel waveguide. To assist in the transference of energy between the guiding layer 703 and the wings 750, the thickness, $t_3$, of the wings 750 may decrease along the length of the guiding layer 703 from a maximum value at the endface 710, as illustrated in FIG. 7(d).

The rate at which the wing width, $w_w$, decreases is controlled by the choice of the wing angle, $\theta_w$, shown in FIG. 7(c), which in turn dictates how adiabatic the mode transformation may be. In particular, a wing angle, $\theta_w$, of 1° or less may be sufficiently small to provide for adiabatic mode transformation from a rib mode to a channel mode. As illustrated, each wing 750 may have the same wing angle, $\theta_w$. Alternatively, each wing 750 may have differing wing angles, $\theta_w$. In addition, the wing angles, $\theta_w$, may have a value less than that or greater than that of the taper angle, $\theta_1$, of the lower portion 706. Alternatively, the wing angle, $\theta_w$, may have a value equal to the taper angle, $\theta_1$, of the lower portion 806, as illustrated in the embodiment of FIG. 8(a).

Figure 8A:
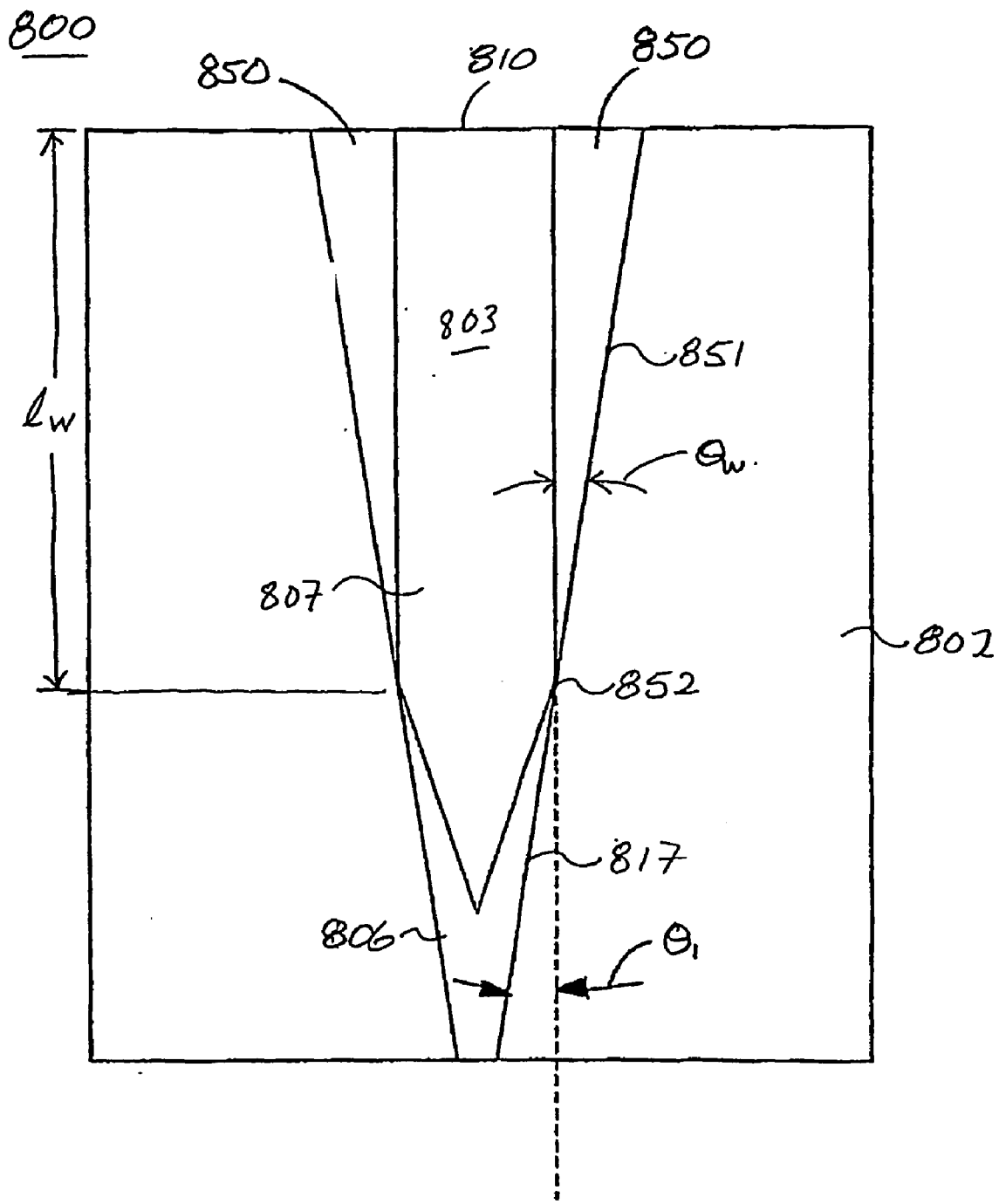
FIGS. 8(a) and 8(b) are top views of waveguides according to the present invention having further exemplary wing configurations.

The waveguide 800 of FIG. 8(a) illustrates a top view of another exemplary embodiment of a winged waveguide, which is similar in many respects to the embodiment of FIGS. 7(a)-(d). The waveguide 800 includes a guiding layer 803 which has two wings 850 extending outwardly from the guiding layer 803 at an endface 810 of the waveguide 800. The waveguide 800 includes a lower cladding layer 802 on which the guiding layer 803 is disposed. An upper cladding layer (not shown) may be disposed on the guiding layer 803 in a similar manner as described with regard to the waveguide 700. The guiding layer 803 includes an upper portion 807 and a lower portion 806, which may be similar to corresponding structures shown in the above embodiments. In the embodiment of FIG. 8(a), however, the wing angle, $\theta_w$, has the same value as the taper angle, $\theta_1$. In addition, the wings 850 optionally have a length, $l_w$, that extends from the endface 810 to the taper point 852 where the lower portion taper begins. Accordingly, for such a configuration of the wings 850 and lower portion 806, the wing sidewalls 851 and the taper sidewalls 817 of the lower portion taper are coplanar. Such a configuration of a waveguide 800 also provides for mode conversion between a rib waveguide mode and a channel waveguide mode.

Figure 8B:
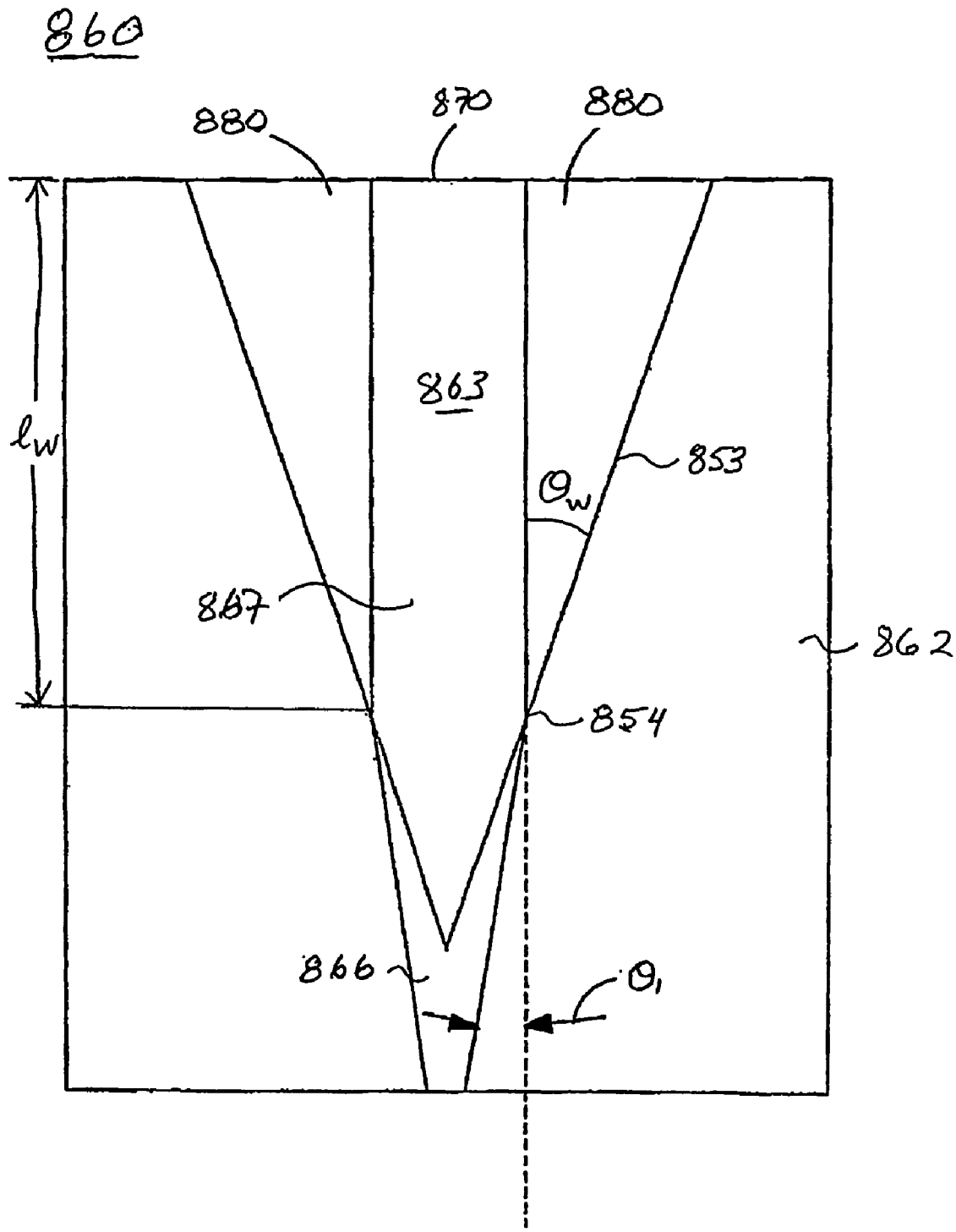

In a further exemplary embodiment similar to that of FIG. 8(a), the wing angle, $\theta_w$, maybe greater than the lower portion taper angle, $\theta_1$, as illustrated in the waveguide 860 of FIG. 8(b). Like the waveguide 800, the waveguide 860 includes a guiding layer 863 which has two wings 880 extending outwardly from the guiding layer 863 at an endface 870 of the waveguide 860. The waveguide 860 includes a lower cladding layer 862 on which the guiding layer 863 is disposed. An upper cladding layer (not shown) may be disposed on the guiding layer 863 in a similar manner as described with regard to the waveguide 800. The guiding layer 863 includes an upper portion 867 and a lower portion 866, which may be similar to corresponding structures shown in the above embodiments. In the embodiment of FIG. 8(b), the wing angle, $\theta_w$, has a larger value than the taper angle, $\theta_1$. In addition, the wings 880 optionally have a length, $l_w$, that extends from the endface 810 to the taper point 854 where the lower portion taper begins. Like the embodiment of FIG. 8(a), the waveguide 860 also provides for mode conversion between a rib waveguide mode and a channel waveguide mode.

Figure 9:
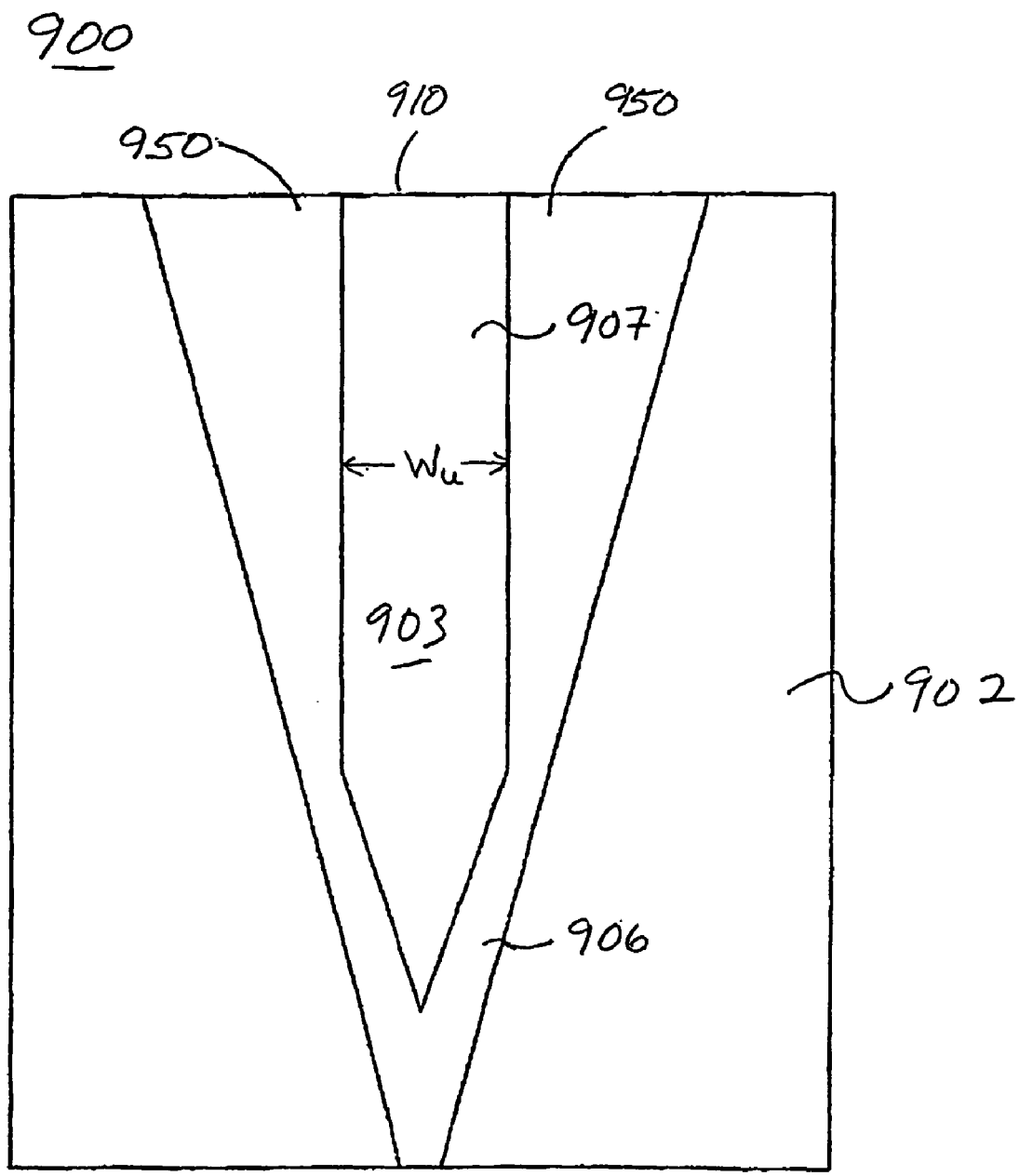
FIG. 9 is a top view of a waveguide according to an illustrative embodiment of the present invention similar to that of FIG. 8(a), but having an upper waveguide portion of decreased width.

Turning now to the exemplary embodiment of FIG. 9, still another configuration of a waveguide 900 in accordance with the present invention is illustrated. The waveguide 900 is similar in several respects to the waveguide 800 of FIG. 8(a). Like the waveguide 800, the waveguide 900 includes a guiding layer 903 which has two wings 950 extending outwardly from the guiding layer 903 at an endface 910 of the waveguide 900. The waveguide 900 includes a lower cladding layer 902 on which the guiding layer 903 is disposed. An upper cladding layer (not shown) may be disposed on the guiding layer 903 in a similar manner as described with regard to the waveguide 800. The guiding layer 903 includes an upper portion 907 and a lower portion 906, similar to the corresponding structures shown in FIG. 8(a). In particular the wing angle has the same value as the taper angle so that the wing sidewalls and the taper sidewalls of the lower portion taper are coplanar. However, unlike the waveguide 800, the upper portion 907 of the waveguide 900 has a width, $w_u$, which at all points along a length of the waveguide 900 is less than the width across the lower portion 906 and the wings 950.

Regarding the fabrication of the waveguides, standard masking and etching steps as described in connection with the illustrative embodiments in Examples I-III may be used in fabricating the waveguides of the present example. As such, a sequence of photolithographic and etching steps would be carried out to realize the lower portion 706, 806, 906, wings, 750, 850, 950, and upper portions 707, 807, 907.

In the foregoing examples, waveguides have been described as being made with tapers that vary in horizontal width, that is, width that changes in the direction of the plane of the substrate that the waveguide is fabricated on. This is an advantage of the invention, for while waveguides with vertical taper could also be fabricated as an embodiment of the present invention, these may be much more difficult to manufacture. In addition, while the tapered sections have been illustrated as having planar walls, the tapered sections could also have arcuate walls to provide a curved taper.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An optical device for transforming a waveguide mode from a first mode shape to a second mode shape, the device comprising:
    a single-mode waveguide comprising a guiding layer comprising a single material, the guiding layer configured to support a single optical mode at one end of the guiding layer and configured to support a single optical mode at an opposing end of the guiding layer, the guiding layer having a first width at an end of the guiding layer and a relatively lesser second width at an opposing end of the guiding layer for transforming a horizontal portion of the waveguide mode, the guiding layer comprising a lower guiding portion comprising the single material and having a first taper and an upper guiding portion comprising the single material and having a second taper, the upper guiding portion disposed on the lower guiding portion; and
    at least two wings disposed on opposing sides of the guiding layer and extending outwardly from the guiding layer to provide a rib waveguide cross-sectional shape to the guiding layer at the wings.

2. An optical device as recited in claim 1, wherein the wings comprise a different material than the guiding layer.

3. An optical device as recited in claim 1, wherein the upper and lower portions comprises the same refractive index.

4. An optical device as recited in claim 1, wherein the wings have a thickness less than the thickness of the lower portion.

5. An optical device as recited in claim 1, wherein the first taper is at a first angle and the second taper is at a second angle different from the first angle, and wherein at least one of the first angle and second angle is in the range of approximately 0° to approximately 0.5°.

6. An optical device as recited in claim 1, wherein the guiding layer has a first thickness at an end of the guiding layer and a relatively lesser second thickness at an opposing end of the guiding layer for transforming a vertical portion of the waveguide mode.

7. An optical device as recited in claim 1, wherein the guiding layer comprises an intermediate portion having a third taper, the intermediate portion disposed between the lower portion and the upper portion.

8. An optical device as recited in claim 1, wherein the upper portion is asymmetric about an axis which bisects the lower portion.

9. An optical device as recited in claim 1, wherein the first thickness is approximately 2.0 micrometers to approximately 4.0 micrometers, and the second thickness is approximately 1.0 micrometers to approximately 2.0 micrometers.

10. An optical device for transforming a waveguide mode from a first mode shape to a second mode shape, the device comprising:
    a single-mode waveguide comprising a guiding layer comprising a rib waveguide cross-sectional shape at a first end of the guiding layer and comprising a non-rib waveguide cross-sectional shape at an opposing second end of the guiding layer, the guiding layer having a first width at an end of the guiding layer and a relatively lesser second width at an opposing end of the guiding layer for transforming a horizontal portion of the waveguide mode, the guiding layer comprising a lower guiding portion comprising the single material and having a first taper and an upper guiding portion comprising the single material and having a second taper, the upper guiding portion disposed on the lower guiding portion; and
    at least two wings disposed on opposing sides of the guiding layer and extending outwardly from the guiding layer to provide the rib waveguide cross-sectional shape to the guiding layer at the first end.

11. An optical device as recited in claim 10, wherein the guiding layer comprises a single material.

12. An optical device as recited in claim 10, wherein the wings comprise a different material than the guiding layer.

13. An optical device as recited in claim 10, wherein the upper and lower portions comprises the same refractive index.

14. An optical device as recited in claim 10, wherein the wings have a thickness less than the thickness of the lower portion.

15. An optical device as recited in claim 10, wherein the first taper is at a first angle and the second taper is at a second angle different from the first angle, and wherein at least one of the first angle and second angle is in the range of approximately 0° to approximately 0.5°.

16. An optical device as recited in claim 10, wherein the guiding layer has a first thickness at an end of the guiding layer and a relatively lesser second thickness at an opposing end of the guiding layer for transforming a vertical portion of the waveguide mode.

17. An optical device as recited in claim 10, wherein the guiding layer comprises an intermediate portion having a third taper, the intermediate portion disposed between the lower portion and the upper portion.

18. An optical device as recited in claim 10, wherein the upper portion is asymmetric about an axis which bisects the lower portion.

19. An optical device as recited in claim 10, wherein the first thickness is approximately 2.0 micrometers to approximately 4.0 micrometers, and the second thickness is approximately 1.0 micrometers to approximately 2.0 micrometers.

* * * * *